(12) United States Patent
Shih

(10) Patent No.: US 11,462,188 B2
(45) Date of Patent: Oct. 4, 2022

(54) FINGERPRINT DISPLAY DEVICE AND INTEGRATION INTEGRATED CIRCUIT AND METHOD FOR DRIVING THE SAME

(71) Applicant: FocalTech Systems Co., Ltd., Hsinchu (TW)

(72) Inventor: Po-Sheng Shih, Hsinchu (TW)

(73) Assignee: FOCAL TECH SYSTEMS CO., LTD., Hsinchu (TW)

( * ) Notice: Subject to any disclaimer, the term of this patent is extended or adjusted under 35 U.S.C. 154(b) by 0 days.

(21) Appl. No.: 17/355,771

(22) Filed: Jun. 23, 2021

(65) Prior Publication Data

US 2021/0407453 A1 Dec. 30, 2021

Related U.S. Application Data

(60) Provisional application No. 63/046,178, filed on Jun. 30, 2020.

(30) Foreign Application Priority Data

Dec. 18, 2020 (TW) .................................. 109144889

(51) Int. Cl.
*G09G 3/36* (2006.01)
*G06V 40/13* (2022.01)

(52) U.S. Cl.
CPC ....... *G09G 3/3677* (2013.01); *G06V 40/1318* (2022.01); *G09G 3/3688* (2013.01); *G09G 2310/0297* (2013.01); *G09G 2310/061* (2013.01)

(58) Field of Classification Search
CPC ............... G09G 3/3677; G09G 3/3688; G09G 2310/0297; G09G 2310/061; G09G 2300/0465; G09G 3/3648; G06V 40/1318; G06F 3/0412; G06F 3/04166
See application file for complete search history.

(56) References Cited

U.S. PATENT DOCUMENTS

| 8,546,738 B2 | 10/2013 | Fukushima | |
| 2009/0141004 A1* | 6/2009 | Yamazaki | H01L 33/005 |
| | | | 345/204 |

(Continued)

FOREIGN PATENT DOCUMENTS

| JP | 2008271280 A | 11/2008 |
| JP | 2009049870 A | 3/2009 |

*Primary Examiner* — Premal R Patel
(74) *Attorney, Agent, or Firm* — Muncy, Geissler, Olds & Lowe, P.C.

(57) ABSTRACT

A fingerprint display device has plural pixel rows. Each pixel row of n pixel rows among the plural pixel rows has plural display pixel units and plural fingerprint pixel units. The n pixel rows are driven at least by corresponding n display scan lines and n reset and select multiplexing lines for performing display and fingerprint sensing. Each fingerprint pixel unit has a reset end and a select end. The reset end of the fingerprint pixel unit of i-th pixel row among the n pixel rows is connected to the i-th reset and select multiplexing line among the n reset and select multiplexing lines, and the select end of the fingerprint pixel unit of i-th pixel row among the n pixel rows is connected to the (i−1)-th reset and select multiplexing line among the n reset and select multiplexing lines.

29 Claims, 15 Drawing Sheets

(56) References Cited

U.S. PATENT DOCUMENTS

| | | | |
|---|---|---|---|
| 2016/0132176 A1* | 5/2016 | Bae | G06F 3/0446 |
| | | | 345/174 |
| 2016/0266695 A1 | 9/2016 | Bae et al. | |
| 2018/0113346 A1* | 4/2018 | Han | G06V 40/1376 |
| 2018/0254288 A1* | 9/2018 | Ling | G09G 3/3233 |

* cited by examiner

FINGERPRINT DISPLAY DEVICE AND INTEGRATION INTEGRATED CIRCUIT AND METHOD FOR DRIVING THE SAME

CROSS REFERENCE TO RELATED APPLICATION

This application claims the benefit of filing date of U.S. Provisional Application Ser. No. 63/046,178, entitled "Proposal to increase transmittance of three-in-one panel" filed Jun. 30, 2020 under 35 USC § 119(e)(1), and claims the benefits of the Taiwan Patent Application Serial Number 109144889, filed on Dec. 18, 2020, the subject matters of which are incorporated herein by reference.

BACKGROUND

1. Field of the Disclosure

The present disclosure relates to a fingerprint display device and, more particularly, to a fingerprint display device integrating optical fingerprint sensors and a flat display panel, and an integration integrated circuit and method for driving the fingerprint display device.

2. Description of Related Art

FIG. 1 is a schematic diagram illustrating the integration of optical fingerprint sensors and a liquid crystal display (LCD) panel. The fingerprint sensor 11 is disposed, for example, between the thin film transistor layer 12 and the filter substrate layer 13 of the liquid crystal display panel structure, so that the backlight from the reflective layer 14 can be reflected, when projecting on the finger pressed against the glass substrate 15, to the fingerprint sensor 11. Since the reflectivity of the ridge and valley of the fingerprint is different, the fingerprint image can be reconstructed according to the sensing amount of the fingerprint sensor 11.

In order to drive the aforementioned fingerprint sensor for fingerprint recognition on the display panel, it is generally necessary to additionally provide a reset line (RST) and a select line (SEL) for controlling the operation of the fingerprint sensor 11. However, the optical fingerprint sensor 11 is embedded in the pixel of the liquid crystal display panel, and thus the additional reset line and select line may cause the aperture ratio of the liquid crystal display panel to be greatly reduced, resulting in a decrease in display brightness.

Therefore, it is desirable to provide an improved fingerprint display device to mitigate and/or obviate the aforementioned problems.

SUMMARY

An object of the present disclosure is to provide a fingerprint display device and an integration integrated circuit and method for driving the same, whereby the reset line and the select line in the fingerprint display device are integrated into a reset and select multiplexing line so as to effectively improve the aperture ratio of the panel.

In one aspect of the present disclosure, there is provided a fingerprint display device having a plurality of pixel rows, each pixel row of n pixel rows among the plurality of pixel rows having a plurality of display pixel units and a plurality of fingerprint pixel units, where n is an integer greater than 1, the n pixel rows being driven by corresponding n display scan lines and n reset and select multiplexing lines for performing display and fingerprint sensing, wherein each fingerprint pixel unit has a reset end and a select end, the reset end of the fingerprint pixel unit of i-th pixel row among the n pixel rows is connected to i-th reset and select multiplexing line among the n reset and select multiplexing lines, and the select end of the fingerprint pixel unit of the i-th pixel row among the n pixel rows is connected to (i−1)-th reset and select multiplexing line of the n reset and select multiplexing lines, where i is an index value between 1 and n.

In another aspect of the present disclosure, there is provided a method for driving a fingerprint display device having a plurality of pixel rows, each pixel row of n pixel rows among the plurality of pixel rows having a plurality of display pixel units and a plurality of fingerprint pixel units, where n is an integer greater than 1, the n pixel rows being driven at least by corresponding n display scan lines and n reset and select multiplexing lines for performing display and fingerprint sensing, each fingerprint pixel unit having a reset end and a select end, the method comprising: sequentially driving the n reset and select multiplexing lines, wherein, when driving the (i−1)-th reset and select multiplexing lines among the n reset and select multiplexing lines, activating the reset end of the fingerprint pixel unit of the (i−1)-th pixel row among the n pixel rows and activating the select end of the fingerprint pixel unit of the i-th pixel row among the n pixel rows, where i is an index value between 1 and n.

In still another aspect of the present disclosure, there is provided an integration integrated circuit for controlling a fingerprint display device having a plurality of pixel rows, in which each pixel row of n pixel rows among the plurality of pixel rows has a plurality of display pixel units and a plurality of fingerprint pixel units, where n is an integer greater than 1, the n pixel rows are driven by corresponding n display scan lines and n reset and select multiplexing lines for performing display and fingerprint sensing, each fingerprint pixel unit has a reset end and a select end, the reset end of the fingerprint pixel unit of i-th pixel row among the n pixel rows is connected to i-th reset and select multiplexing line among the n reset and select multiplexing lines, and the select end of the fingerprint pixel unit of the i-th pixel row among the n pixel rows is connected to (i−1)-th reset and select multiplexing line of the n reset and select multiplexing lines, where i is an index value between 1 and n, so as to sequentially drive the display scan lines for performing display, and sequentially drive the reset and select multiplexing lines for performing fingerprint sensing.

Other objects, advantages, and novel features of the disclosure will become more apparent from the following detailed description when taken in conjunction with the accompanying drawings.

DETAILED DESCRIPTION

The following embodiments describe the implementation and operation principles of the present disclosure. Those skilled in the art to which the present disclosure pertains may understand the features and effects of this disclosure through the aforementioned embodiments, and may perform combination, modification, replacement or adaption based on the spirit of the present disclosure.

Figure 1:
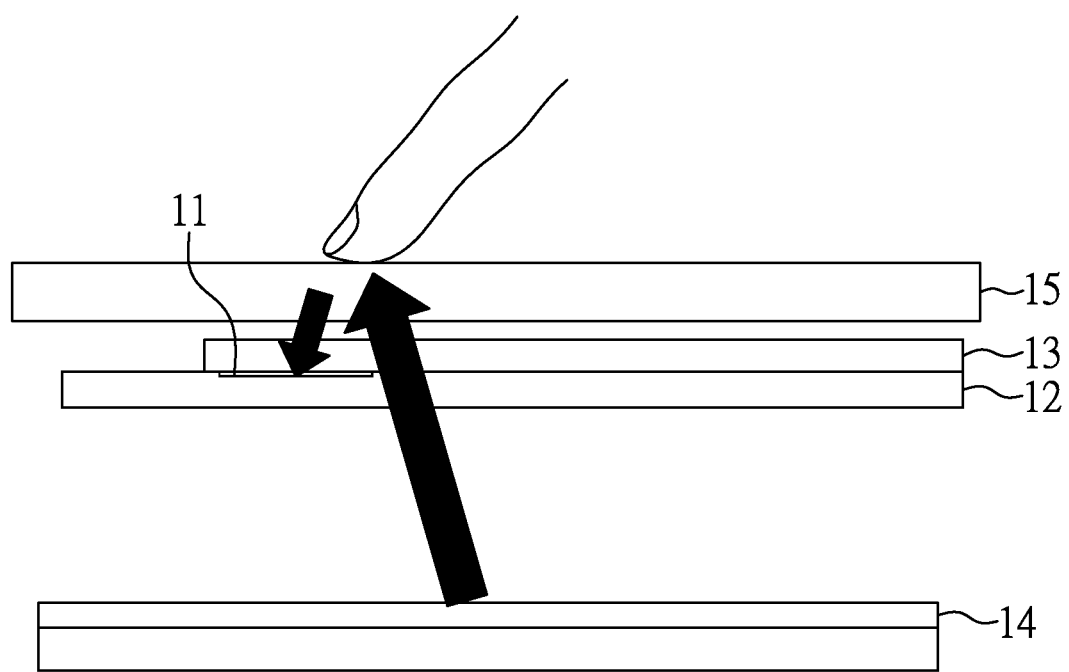
FIG. 1 is a schematic diagram illustrating the integration of optical fingerprint sensors and a liquid crystal display panel.
Figure 2A:
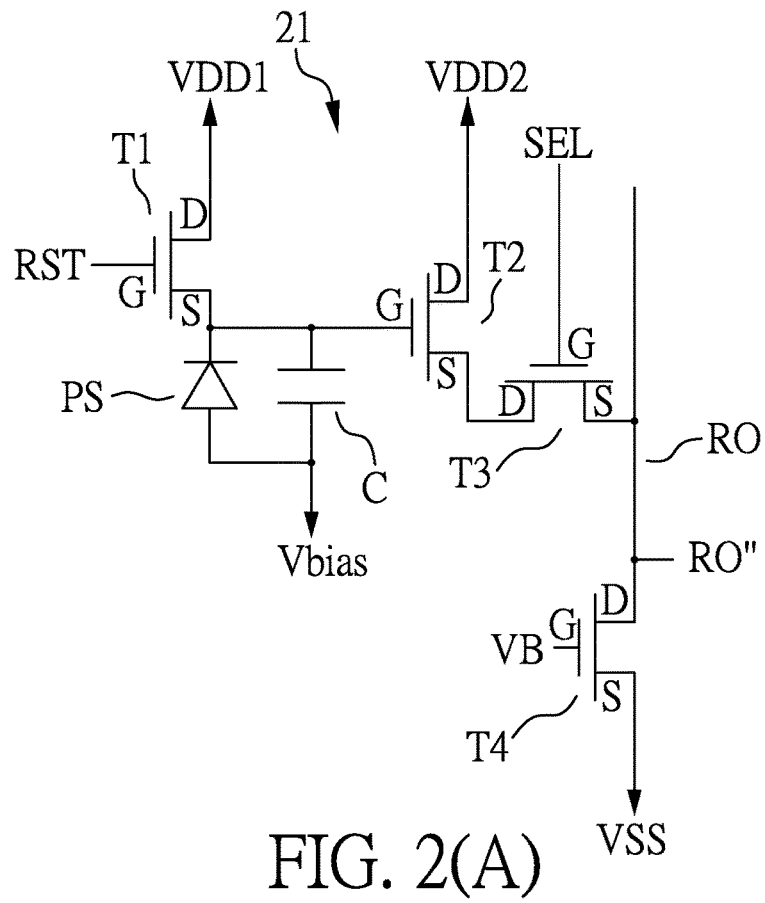
FIG. 2(A) is a circuit diagram of an optical fingerprint pixel unit.

FIG. 2 (A) is a circuit diagram of an optical fingerprint pixel unit 21, which is a three-transistor (3T) fingerprint pixel circuit. The fingerprint pixel unit 21 is implemented by a reset transistor T1, a drive transistor T2, a select transistor T3, a photo sensor PS and a capacitor C, and an array composed of a plurality of fingerprint pixel units 21 constitutes a fingerprint sensor. In the array composed of a plurality of fingerprint pixel units, the fingerprint pixel units 21 of the same column share a load transistor T4, such as the load transistor T4 connected to the fingerprint pixel unit 21 shown in FIG. 2(A). In addition, the transistors T1~T4 shown in FIG. 2(A) are NMOS transistors, but the present disclosure is not intended to be so limited. It is conceivable that the transistors T1~T4 may be other types of MOS transistors, such as PMOS transistors. Each transistor T1~T4 has a control end and two connection ends. For MOS transistors, the control end is a gate (G), and the two connection ends are a drain (D) and a source (S). Optionally, the reset transistor T1 may be in the form of a dual gate. Furthermore, the aforementioned reset transistor T1, drive transistor T2 or select transistor T3 is not limited to a single transistor, and may be two transistors connected in series with two control ends connected together.

In the aforementioned optical fingerprint pixel unit 21 of FIG. 2(A), the control end (G) of the reset transistor T1 is connected to the reset line RST, and the two connection ends (D, S) thereof are respectively connected to a first voltage VDD1 and the photo sensor PS. The control end (G) of the drive transistor T2 is connected to the connection end (S) of the reset transistor T1 and the photo sensor PS, and the two connection ends (D, S) thereof are respectively connected to a second voltage VDD2 and the connection end (D) of the select transistor T3, wherein the first voltage VDD1 and the second voltage VDD2 may be the same DC voltage source or different DC voltage sources. The control end (G) of the select transistor T3 is connected to the select line SEL, and the two connection ends (D, S) thereof are respectively connected to the connection end (S) of the drive transistor T2 and the readout line RO. The two ends of the capacitor C are respectively connected to the control end (G) of the drive transistor T2 and a bias voltage Vbias. The capacitor C may be a capacitor structure formed by internal components of the photo sensor PS, or a capacitor structure additionally configured, or a combination thereof. The two ends of the photo sensor PS are respectively connected to the connection end (S) of the reset transistor T1 and the bias voltage Vbias. The control end (G) of the load transistor T4 is connected to a fifth voltage VB, and the two connection ends (D, S) thereof are respectively connected to the readout line RO and a sixth voltage VSS.

With the aforementioned optical fingerprint pixel unit 21 of FIG. 2(A), the fingerprint sensing operation can be performed as follows. Firstly, the reset line RST is driven to turn on the reset transistor T1, and the terminal voltage of the capacitor C is reset to a predetermined value, that is, the first voltage VDD. Then, the reset transistor T1 is turned off, so that the photo sensor PS continues to be exposed for a period of time and, with the variation of the illumination intensity and exposure time, the discharge amount of the capacitor C is different, so that the terminal voltage of the capacitor C is also different. When a predetermined exposure time is reached, the select line SEL is driven to turn on the select transistor T3, so that the drive transistor T2 outputs current to the readout line RO, wherein the magnitude of the output current is related to the voltage of the end of the capacitor C connected to the control end (G) of the drive transistor T2, that is, related to the illumination intensity and exposure time. The load transistor T4 connected to the readout line RO is equivalent to an active load, and thus the voltage of the readout end RO" of the readout line RO is related to the reset transistor T1 and the resistance of the active load. Accordingly, the illumination intensity can be determined by using an integrated circuit to read the voltage of the readout end RO".

Figure 2B:
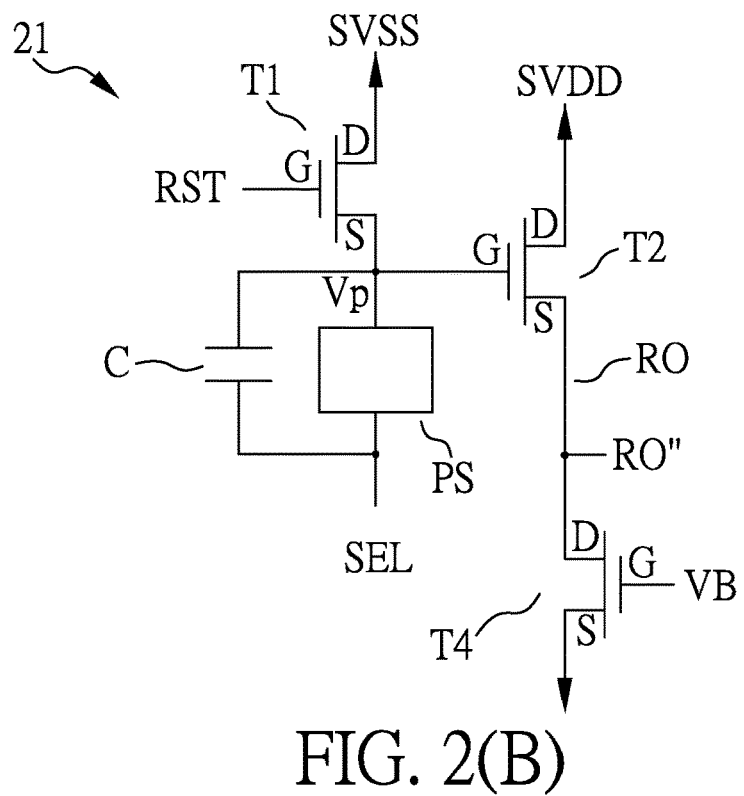
FIG. 2(B) is a circuit diagram of another optical fingerprint pixel unit.

FIG. 2 (B) is a circuit diagram of another optical fingerprint pixel unit 21, which is a two-transistor (2T) fingerprint pixel circuit. The fingerprint pixel unit 21 is implemented by a reset transistor T1, a drive transistor T2, a photo sensor PS and a capacitor C, and an array composed of a plurality of fingerprint pixel units 21 constitutes a fingerprint sensor. In the array composed of a plurality of fingerprint pixel units 21, the fingerprint pixel units 21 of the same row share a load transistor T4, such as the load transistor T4 connected to the fingerprint pixel unit 21 shown in FIG. 2(B). In addition, the transistors T1, T2 and T4 shown in FIG. 2(B) are NMOS transistors, but the present disclosure is not intended to be so limited. It is conceivable that the transistors T1, T2 and T4 may be other types of transistors, such as PMOS transistors. Each of the transistors T1, T2 and T4 has a control end and two connection ends. For MOS transistors, the control end is the gate (G), and the two connection ends are the drain (D) and the source (S). Optionally, the reset transistor T1 may be in the form of a dual gate. Furthermore, the aforementioned reset transistor T1 or drive transistor T2 is not limited to a single transistor, and may be two transistors connected in series with the control ends connected together.

In the aforementioned optical fingerprint pixel unit 21 of FIG. 2(B), the control end (G) of the reset transistor T1 is connected to the reset line RST, and the two connection ends (D, S) thereof are respectively connected to a third voltage SVSS and the photo sensor PS. The control end (G) of the drive transistor T2 is connected to the connection end (S) of the reset transistor T1 and the photo sensor PS, and the two connection ends (D, S) thereof are respectively connected to a fourth voltage SVDD and the readout line RO. The two ends of the photo sensor PS are respectively connected to the connection end (S) of the reset transistor T1 and the control end (G) of the drive transistor T2, and the select line SEL. The two ends of the capacitor C are also respectively connected to the connection end (S) of the reset transistor T1 and the control end (G) of the drive transistor T2, and the select line SEL. The capacitor C may be a capacitor structure formed by internal components of the photo sensor PS or a capacitor structure additionally configured, or a combination thereof. The control end (G) of the load transistor T4 is connected to a fifth voltage VB, and the connection end (D) thereof is connected to the sensing line RO.

With the optical fingerprint pixel unit 21 of FIG. 2(B), the fingerprint sensing operation is performed as follows. Firstly, the reset line RST is driven to turn on the reset transistor T1, and the terminal voltage Vp of the capacitor C is reset to a predetermined value, that is, the third voltage SVSS, whereby the third voltage SVSS ensures that the drive transistor T2 is turned off. Then, the reset transistor T1 is turned off, so that the photo sensor PS continues to be exposed for a period of time. With the variation of the illumination intensity and the exposure time, the discharge amount of the capacitor C is different, and thus the terminal voltage Vp of the capacitor C is also different. When a predetermined exposure time is reached, the select line SEL is driven to switch the voltage of the select line SEL from low level to high level (voltage difference $\Delta V$) and, because of the coupling effect, the terminal voltage Vp of the capacitor C will also increase by $\Delta V$, so the drive transistor T2 can be turned on to output current to the readout line RO. The magnitude of the output current is related to the terminal voltage Vp of the capacitor C, that is, related to the illumination intensity and the exposure time. The load transistor T4 connected to the readout line RO is equivalent to an active load. Therefore, the voltage of the readout end RO" of the readout line RO is related to the reset transistor T1 and the resistance of the active load. Accordingly, the illumination intensity can be determined by using an integrated circuit to read the voltage of the read end RO".

Figure 3:
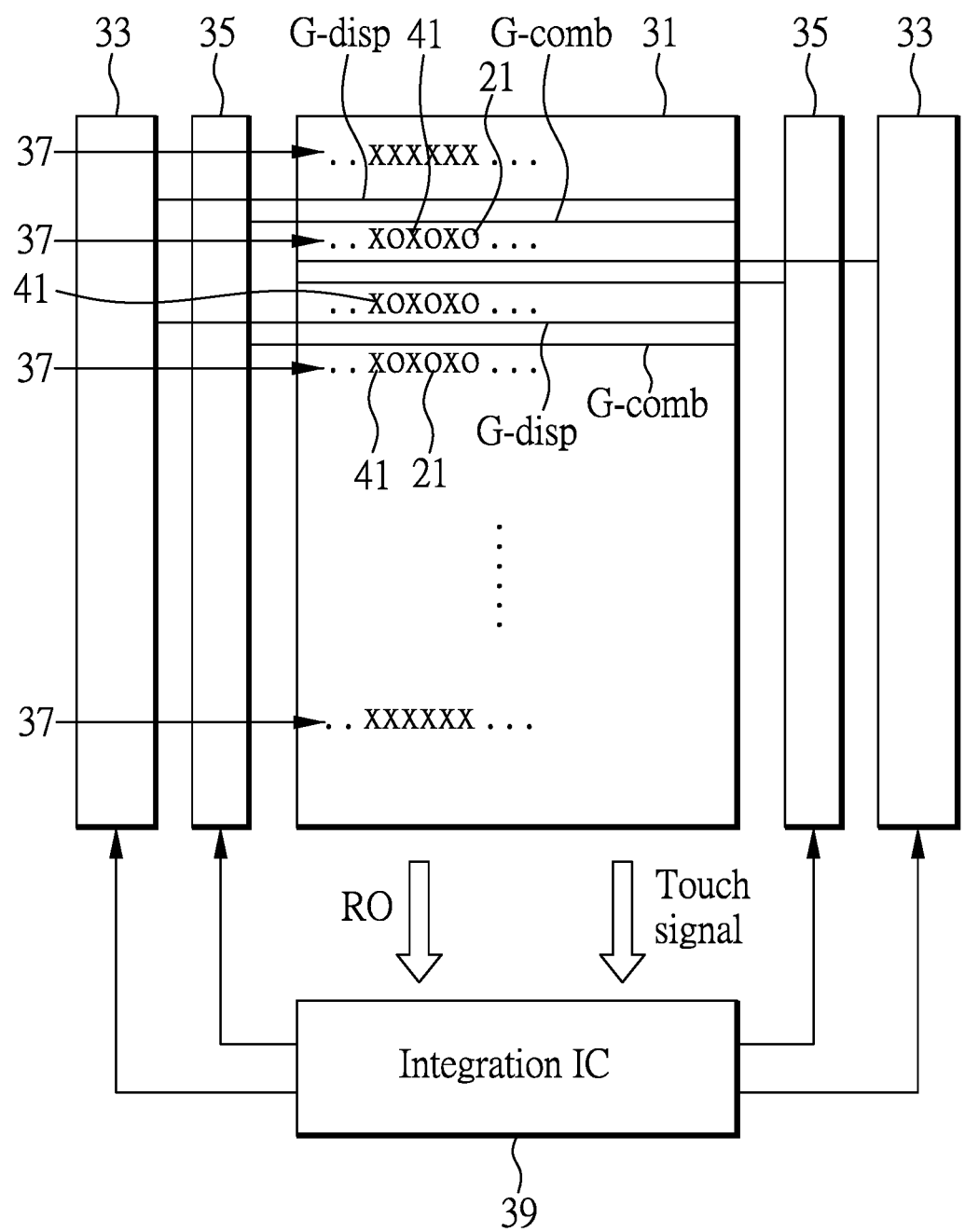
FIG. 3 shows a system structure of the fingerprint display device of the present disclosure.

In order to avoid the problem that the aperture ratio of the display panel is greatly reduced due to additional arrangement of the reset line RST and the select line as shown in FIGS. 2(A) and 2(B), in one embodiment of the fingerprint display device of the present disclosure, the reset line RST and the select line SEL of adjacent rows are multiplexed so that there is only one reset and select multiplexing line G-comb required for an optical fingerprint pixel unit. Please refer to FIG. 3 showing a system structure of the fingerprint display device of the present disclosure, in which there is GOA (gate on array) circuit 33 for display gate driving provided on the left and right sides of a panel 31 for sequentially driving the display scan lines G-disp to perform display according to the control signal of an integration integrated circuit 39. In addition, in order to realize the fingerprint sensing function, there is GOA circuit 35 for fingerprint sensing driving provided on the left and right sides of the panel 31 for sequentially driving the reset and select multiplexing lines G-comb to perform fingerprint sensing according to the control signal of the integration integrated circuit 39. The sensed fingerprint data is read from the readout line RO to the integration integrated circuit 39 for performing fingerprint recognition. Specifically, in the practical circuit, after extending out of the panel 31, the readout line RO may be multiplexed with a data line by a multiplexer for connection to the integration integrated circuit 39 through one line, so as to save the number of pins of the integration integrated circuit 39. In the present disclosure, the panel 31 can be any type of flat display panel, such as an LCD panel or an OLED panel. Although the GOA circuit 33 for display gate driving and the GOA circuit 35 for fingerprint sensing driving are both disposed on the left and right sides of the panel 31 as shown in this embodiment, the present disclosure is not limited to this. In other embodiments, the GOA circuit 33 for display gate driving and the GOA circuit 35 for fingerprint sensing driving may be arranged on the same side of the panel 31, or the GOA circuit 33 for display gate driving is arranged on one side of the panel 31, and the GOA circuit 35 for fingerprint sensing driving is arranged on the opposite side of the panel 31. In addition, the panel 31 of the fingerprint display device of the present disclosure may provide a touch sensing function. For example, by dividing the common electrode of the panel 31 into touch sensors (not shown), the touch sensing function can be realized by using the touch sensors to sense the touch of the user's finger and send the touch signal to the integration integrated circuit 39 for touch detection, wherein the use of divided common electrode as touch sensors is known to those skilled in the art, and thus a detailed description is deemed unnecessary. That is, in one embodiment, the present disclosure may provide an electronic device with three-in-one functions including fingerprint sensing, touch sensing and display, an integration integrated circuit that can be used to drive the electronic device, and a driving method thereof.

FIG. 3 shows that the fingerprint display device of the present disclosure has a plurality of pixel rows 37. Among the plurality of pixel rows 37, there are n pixel rows 37 provided for display and fingerprint recognition functions, where n is an integer greater than 1. That is, each pixel row 37 of the n pixel rows 37 has a plurality of display pixel units 41 and a plurality of fingerprint pixel units 21, and the n pixel rows 37 are driven at least by n display scan lines G-disp and n reset and select multiplexing lines G-comb for performing display and fingerprint sensing. In one embodiment, the number of display pixel units 41 in a pixel row 37 is the same as the number of fingerprint pixel units 21. However, the present disclosure is not limited to this. In other embodiments, the number of fingerprint pixel units 21 in a pixel array 37 may be less than the number of display pixel units 41. In addition, the pixel arrays 37 in the entire display area of the panel 31 have display pixel units 41 and fingerprint pixel units, or the pixel rows 37 in only a portion of the display area, e.g. one third of the display area, have display pixel units 41 and fingerprint pixel units 21, while the pixel rows 37 in the remaining display area only have display pixel units 41.

Figure 4:
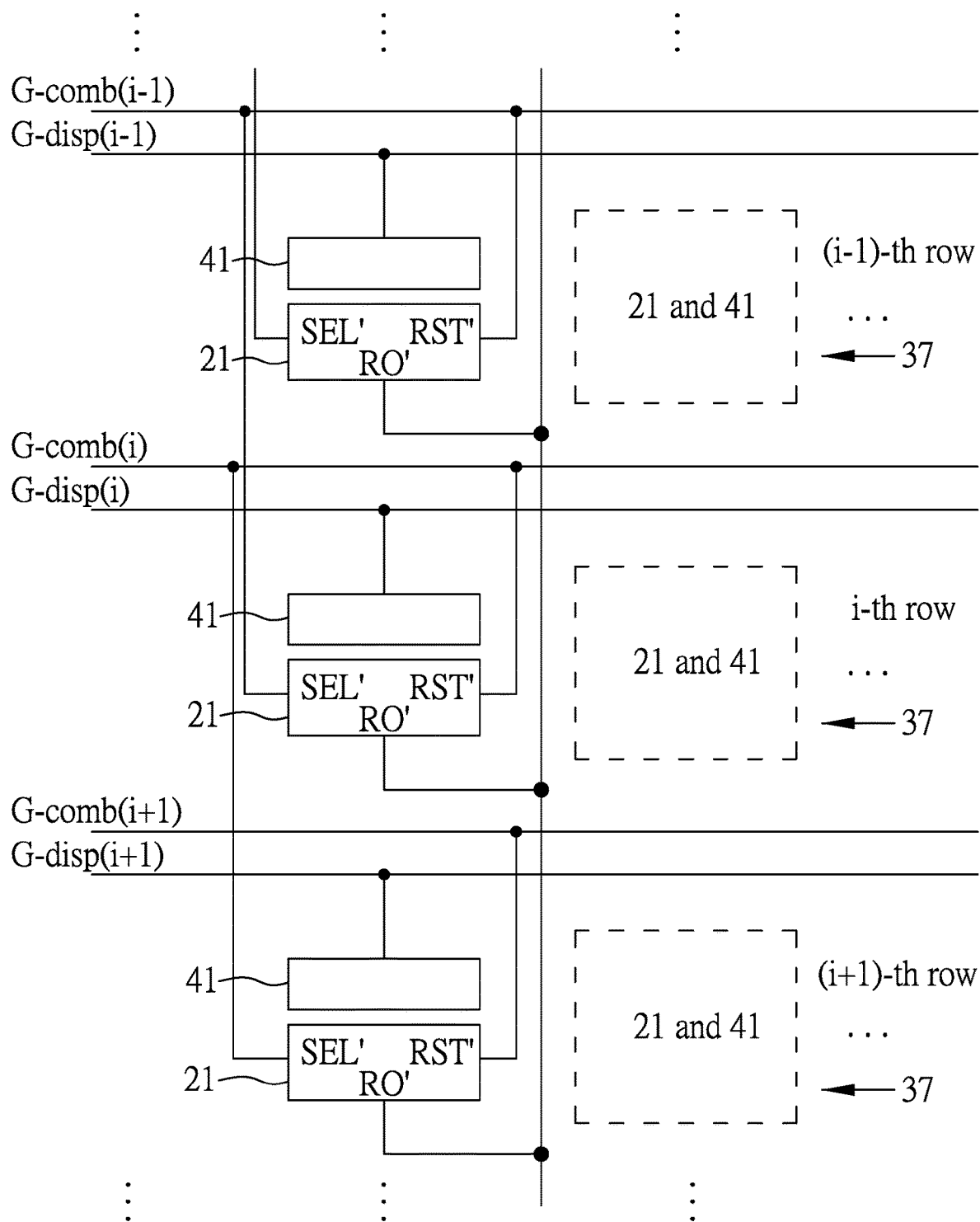
FIG. 4 schematically shows the pixel rows including (i−1)-th row, i-th row and (i+1)-th row in the fingerprint display device of the present disclosure.

Please also refer to FIG. 4 which schematically shows the (i−1)-th, i-th and (i+1)-th pixel rows 37 of the n pixel rows 37 in the fingerprint display device, wherein the pixel row 37 has the display pixel units 41 and the fingerprint pixel units 21 as shown in FIG. 2(A) or 2(B). In FIG. 4, a display pixel unit 41 in a pixel row 37 is shown to correspond to a fingerprint pixel unit 21, and this is only for convenience of description but not limitation. The display pixel units 41 of the same pixel row 37 are connected to the same display scan line G-disp, and the fingerprint pixel units 21 of the same pixel row 37 are connected to the reset and select multiplexing line G-comb corresponding to said pixel row 37 and the reset and select multiplexing line G-comb corresponding to the previous pixel row 37. Accordingly, the n pixel rows 37 are driven by corresponding n display scan lines G-disp and n reset and select multiplexing lines G-comb for performing display and fingerprint sensing. Each fingerprint pixel unit 21 has a reset end RST' and a select end SEL'. The reset end RST' of the fingerprint pixel unit 21 of the i-th pixel row among the n pixel rows 37 is connected to the i-th reset and select multiplexing line G-comb(i) among the n reset and select multiplexing lines G-comb. The select end SEL' of the fingerprint pixel unit 21 of the i-th pixel row among the n pixel rows 37 is connected to the (i−1)-th reset and select multiplexing line G-comb(i−1) among the n reset and select multiplexing lines G-comb, where i is an index value between 1 and n. Accordingly, with the fingerprint display device of the present disclosure, the i-th display scan line G-disp(i) among the n display scan lines G-disp is used to drive the display pixel units 41 the i-th pixel row among the n pixel rows 37 for display, and the (i−1)-th reset and select multiplexing line G-comb(i−1) and the i-th reset and select multiplexing line G-comb(i) among the n reset and select multiplexing lines G-comb are used to drive the select end SEL' and the reset end RST' of the fingerprint pixel unit 21 of the i-th pixel row among the n pixel rows 37 for performing fingerprint sensing.

Figure 5A:
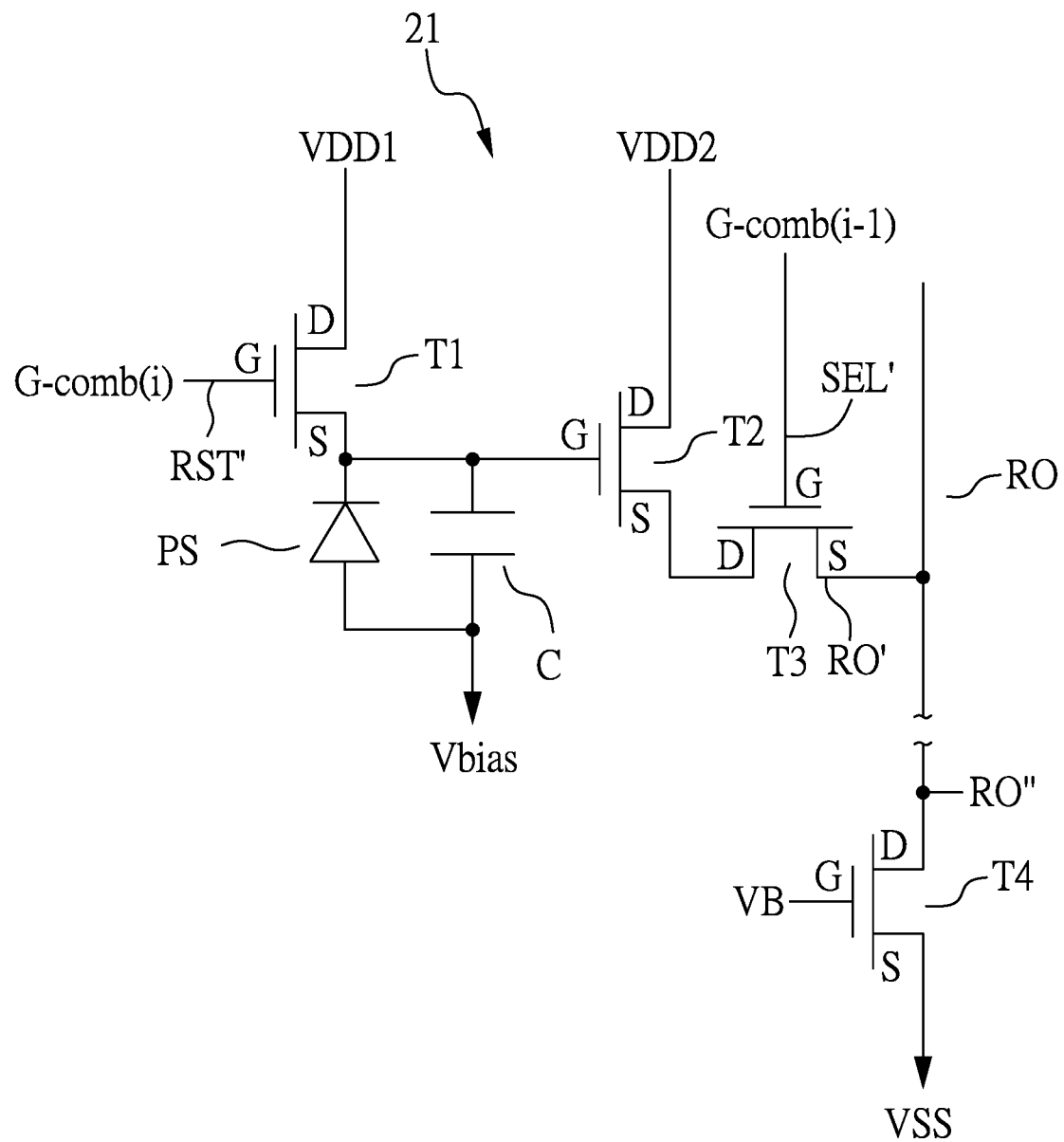
FIG. 5(A) is a circuit diagram of the fingerprint pixel unit of i-th pixel row according to an embodiment of the present disclosure.

Please also refer to FIG. 5(A) showing a circuit diagram of the fingerprint pixel unit 21 of the i-th pixel row among the n pixel rows 37 according to an embodiment of the present disclosure. The reset transistor T1 has a control end (G), a first connection end (D) and a second connection end (S), in which the control end (G) is used as a reset end RST' and is connected to the i-th reset and select multiplexing line G-comb(i) among the n reset and select multiplexing lines G-comb, and the first connection end (D) is connected to the first voltage VDD1. The drive transistor T2 has a control end (G), a first connection end (D) and a second connection end (S), in which the control end (G) is connected to the second connection end (S) of the reset transistor T1, and the first connection end (D) is connected to the second voltage VDD2, where the first voltage VDD1 and the second voltage VDD2 may be the same DC voltage source or different DC voltage sources. The select transistor T3 has a control end (G), a first connection end (D) and a second connection end (S), in which the control end (G) is used as the select end SEL' and is connected to the (i−1)-th reset and select multiplexing line G-comb (i−1) among the n reset and select multiplexing lines G-comb, the first connection end (D) is connected to the second connection end (S) of the drive transistor T2, and the second connection end (S) is used as the readout end RO' and is connected to the readout line RO. The photo sensor PS has two ends respectively connected to the second connection end (S) of the reset transistor T1 and a bias voltage Vbias. The capacitor C has two ends respectively connected to the control end (G) of the drive transistor T2 and the bias voltage Vbias. In one embodiment, the aforementioned capacitor C may be a capacitor structure formed by internal components of the photo sensor PS, but it is not limited to this.

It can be seen from FIG. 5(A) that the present disclosure is capable of replacing the original two lines RST and SEL with one reset and select multiplexing line G-comb, so as to drive a pixel row in a manner of reducing one driving line thereby improving the aperture ratio of the panel. The reset and select multiplexing lines G-comb(1), G-comb(2), . . . G-comb(n−1), G-comb(n) in the entire fingerprint sensor array are driven in sequence. When driving the reset and select multiplexing line G-comb(i−1), the select transistor T3 of the fingerprint pixel unit 21 of the i-th pixel row among the n pixel rows is turned on to read the fingerprint signal, and when driving the reset and select multiplexing line G-comb(i), the reset transistor T1 is turned on to reset the voltage level of the capacitor C, so as to achieve the effect of fingerprint sensing.

Figure 5B:
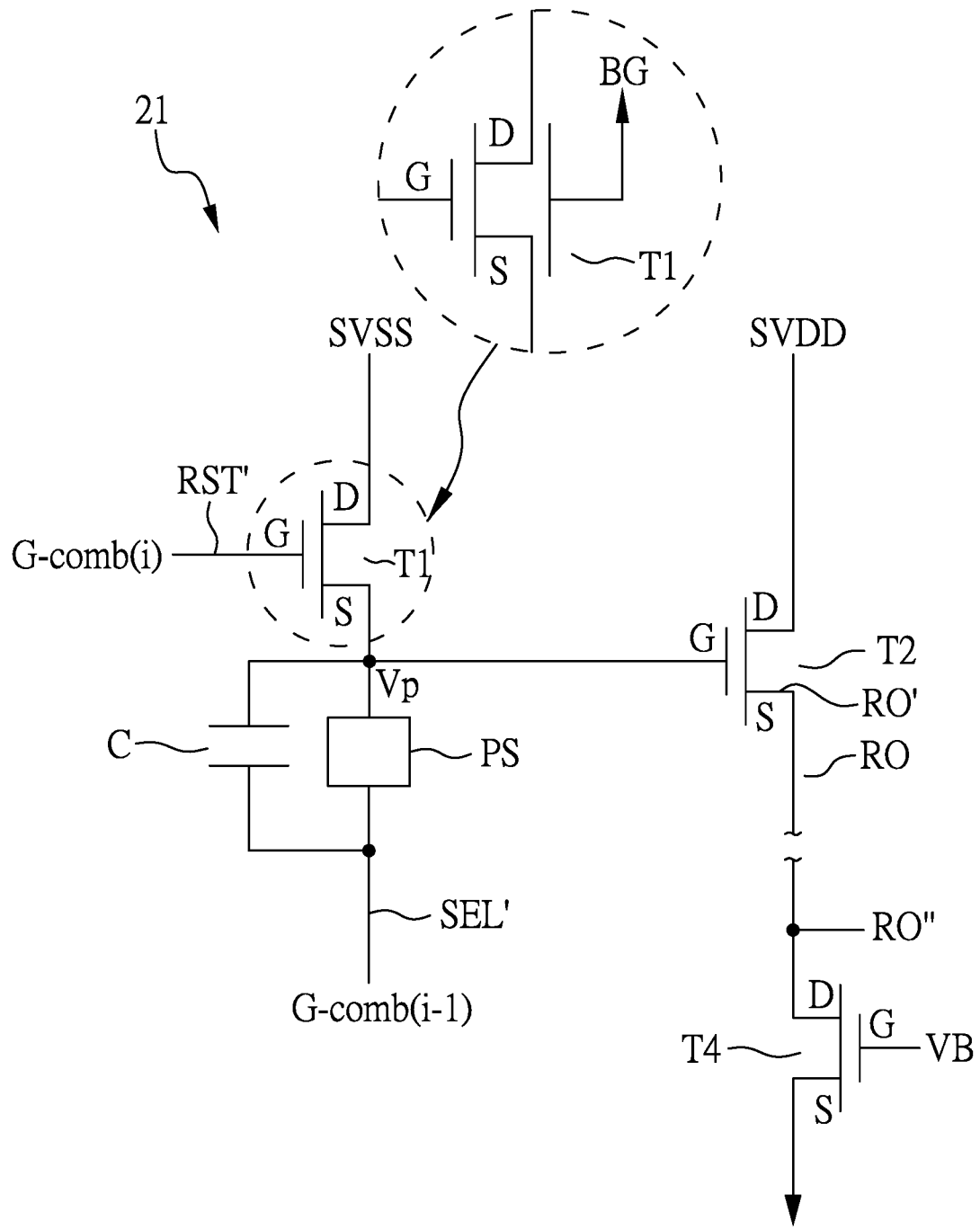
FIG. 5(B) is another circuit diagram of the fingerprint pixel unit of i-th pixel row according to an embodiment of the present disclosure.

FIG. 5(B) is another circuit diagram of the fingerprint pixel unit 21 of the i-th pixel row among the n pixel rows according to an embodiment of the present disclosure. The reset transistor T1 has a control end (G), a first connection end (D) and a second connection end (S), in which the control end (G) is used as a reset end RST' and connected to the i-th reset and select multiplexing line G-comb(i) among the n reset and select multiplexing lines G-comb, and the first connection end (D) is connected to a third voltage SVSS. The drive transistor T2 has a control end (G), a first connection end (D) and a second connection end (S), in which the control end (G) is connected to the second connection end (S) of the reset transistor T1, the first connection end (D) is connected to the fourth voltage SVDD, and the second connection end (S) is used as a readout end RO' and is connected to the readout line RO. The photo sensor PS has a first end and a second end, in which the first end is connected to the second connection end (S) of the reset transistor T1, and the second end is used as the select end SEL' and connected to the (i−1)-th reset and select multiplexing line G-comb(i−1) among the n reset and select multiplexing lines G-comb. The capacitor C has two ends respectively connected to the control end (G) of the drive transistor T2 and the second end of the photo sensor PS. In one embodiment, the aforementioned capacitor C may be a capacitor structure formed by internal components of the photo sensor PS, but it is not limited thereto.

It can be seen from FIG. 5(B) that the present disclosure is capable of replacing the two lines RST and SEL with one reset and select multiplexing line G-comb, so as to drive a pixel row in a manner of reducing one driving line thereby improving the aperture ratio of the panel. The reset and select multiplexing lines G-comb(1), G-comb(2) . . . G-comb(n−1), G-comb(n) in the entire fingerprint sensor array are driven in sequence. When driving the reset and select multiplexing line G-comb(i−1), power is supplied to the photo sensor PS of the fingerprint pixel unit 21 of the i-th pixel row among the n pixel rows so as to increase the voltage level of the select end SEL' thereby turning on the drive transistor T2 to read the fingerprint signal. Then, the reset and select multiplexing line G-comb(i) is driven to turn on the reset transistor T1 of the fingerprint pixel unit 21 of the i-th pixel row among the n pixel rows to reset the level of the capacitor C, so as to achieve the effect of fingerprint sensing. In addition, in FIG. 5(B), during the fingerprint pixel unit 21 being in exposure, the reset and select multiplexing lines G-comb(i−1) and G-comb(i) are maintained at the same level and, when the amount of exposure is relatively large, because the photocurrent of the photo sensor PS is large, the terminal voltage level Vp of the capacitor C is very close to or even equal to the voltage level of the reset and select multiplexing line G-comb; that is, the Vgs of the reset transistor T1 is close to 0V. To prevent the reset transistor T1 from being turned on during the exposure time, an additional gate may be added to the reset transistor T1; that is, as shown in FIG. 5(B), the reset transistor T1 may be a top gate transistor and is connected to a bottom gate (BG). By adjusting the voltage of the bottom gate (BG), the threshold voltage (Vth) of the reset transistor T1 can be adjusted, so as to adjust the threshold voltage (Vth) to a predetermined ideal value without changing the manufacture process thereby ensuring that the reset transistor T1 will not be turned on during the exposure time.

Figure 6:
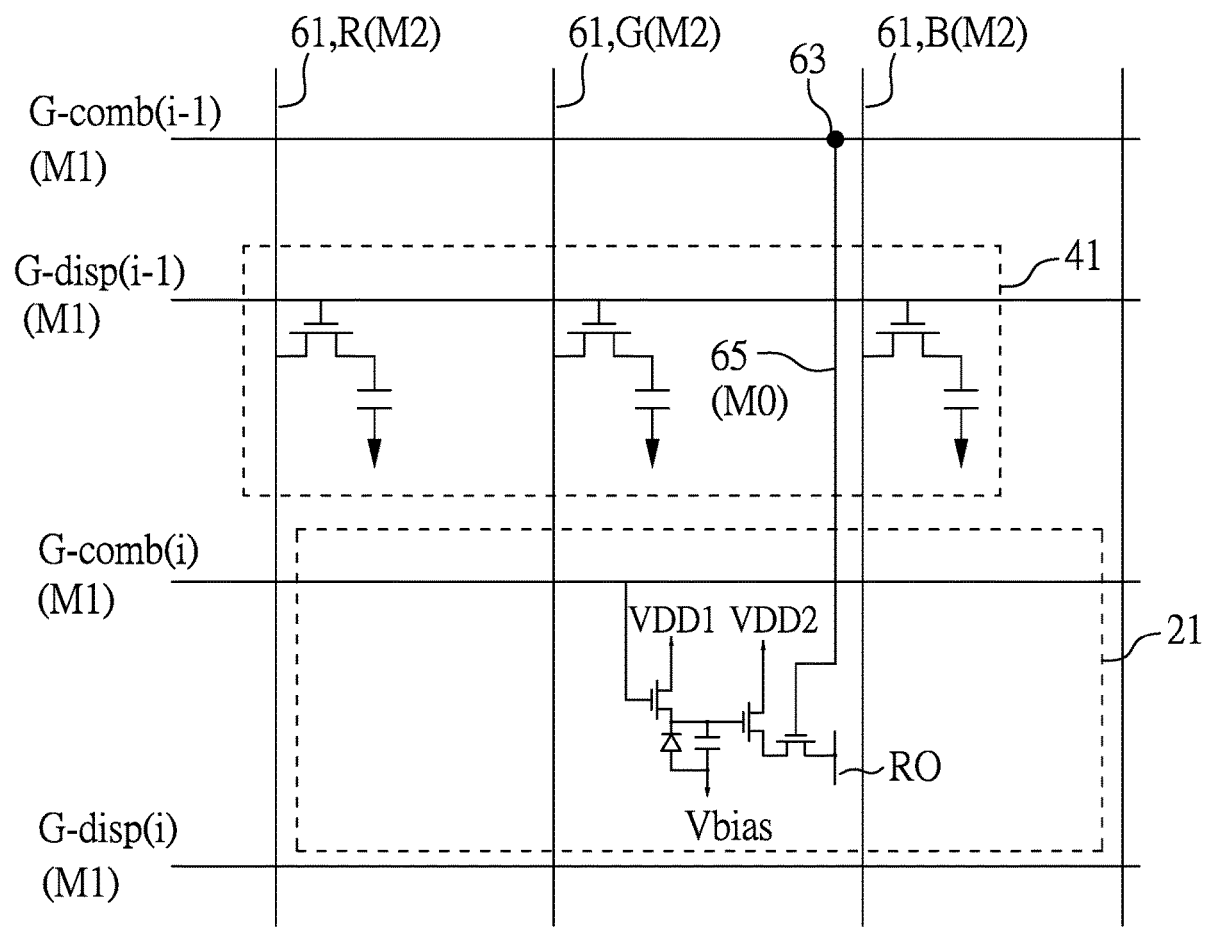
FIG. 6 is a schematic diagram of the fingerprint pixel unit of FIG. 5(A) integrated into the display pixel unit of the present disclosure.

FIG. 6 is a schematic diagram of the fingerprint pixel unit 21 of FIG. 5(A) integrated into the display pixel unit 41 of the present disclosure, which shows that the display pixel unit 41 includes three R/G/B sub-pixels of LCD integrated with a fingerprint pixel unit 21. The circuit area of the fingerprint pixel unit 21 is arranged in the area below the three R/G/B sub-pixels, but this is only an example and not a limitation. It is conceivable that the circuit area of the fingerprint pixel unit 21 may be concentrated to be arranged in the area below a specific sub-pixel. In addition, in this embodiment, an LCD panel is taken as an example, but the present disclosure is not limited to this. The present disclosure is also applicable to other types of panels such as OLED, or to other types of pixel arrangements such as RGBW. Although the display pixel unit 41 and the fingerprint pixel unit 21 in FIG. 6 belong to different pixel rows, they may belong to the same pixel row in other embodiments. In the present disclosure, the fingerprint pixel units 21 are arranged among the R/G/B sub-pixels of multiple display pixel units 41 while whether they belong to the same row or not can be adjusted according to the design requirement, and the present disclosure is not limited to this.

In the embodiment of FIG. 6, the LTPS LCD manufacturing process is taken as an example. The display scan lines G-disp and the reset and select multiplexing lines G-comb are made of metal-1 layer (M1). The data lines 61 connected to the three R/G/B sub-pixels are made of metal-2 layer (M2), which are marked as R(M2), G(M2), and B(M2) in FIG. 6. The data lines 61 are provided to send display data to each display sub-pixel. In one embodiment, the reset and select multiplexing line G-comb (i–1) can be transferred from M1 to another conductive layer, such as metal-0 layer (M0), through a via 63, and then connected to the circuit area of the fingerprint pixel unit 21 of the i-th row through the line 65 of the metal-0 layer. In order not to affect the aperture ratio, the line 65 of the metal-0 layer can be disposed below the data line 61 and substantially overlap with the data line 61. In another embodiment, the conductive layer used for layer transfer may be metal-3 layer (M3), and the line 65 is arranged above the data line 61, and extends along and substantially overlaps with the data line 61.

Figure 7A:
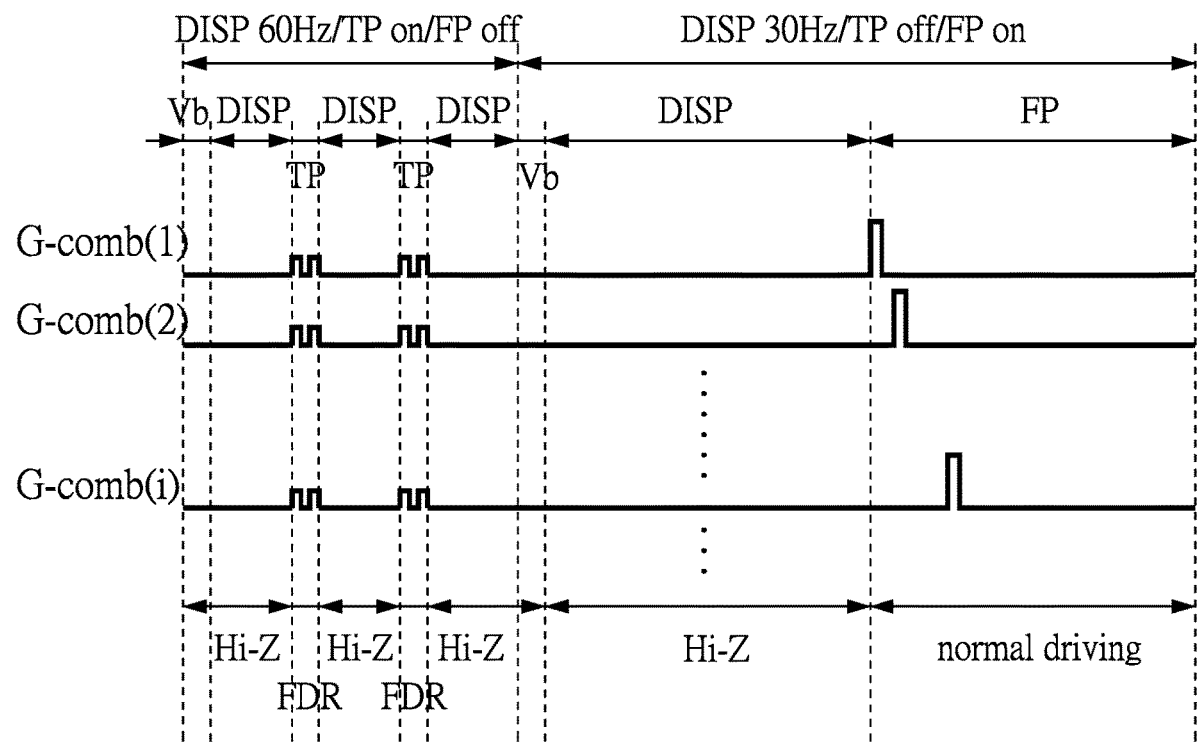
FIG. 7(A) is an operation timing diagram of the fingerprint display device using the fingerprint pixel unit of FIG. 5(A) according to the present disclosure.

FIG. 7(A) is an operation timing diagram of the fingerprint display device using the fingerprint pixel unit 21 of FIG. 5(A) according to the present disclosure. The fingerprint sensing display device of this embodiment is provided with display, touch and fingerprint functions. In FIG. 7(A), DISP stands for display, TP stands for touch, FP stands for fingerprint sensing, Vb stands for vertical blanking, Hi-Z stands for high impedance, and FDR stands for full drive. As shown in FIG. 7(A), when fingerprint sensing is not activated (FP off), display driving and touch sensing are performed in a time-sharing manner. In the display period (DISP), in order to reduce the capacitive load of the reset and select multiplexing line G-comb to the data line 61, the reset and select multiplexing line G-comb is set to high impedance (Hi-Z); that is, the reset and select multiplexing line G-comb is not electrically connected to a voltage source and becomes a floating state, so as to reduce the capacitive load on the data line 61. However, the present disclosure is not limited to this. If the capacitive load on the data line 61 is within an acceptable range, it is applicable to connect the reset and select multiplexing line G-comb to a voltage source. In the touch period (TP), a full drive signal that is the same as the touch driving signal, is applied to the reset and select multiplexing line G-comb, in which the voltage swing, phase and frequency of the full drive signal are approximately the same as those of the signal that drives the touch electrode, so as to reduce the load of the touch electrode. When fingerprint sensing is activated (FP on), in order to match the fingerprint sensing and exposure time, the update frequency of the display data can be adjusted accordingly. In this embodiment, the update frequency is slowed down. In the fingerprint sensing period, the reset and select multiplexing lines G-comb are driven in sequence to achieve the aforementioned functions of fingerprint signal reading and capacitor resetting.

Figure 7B:
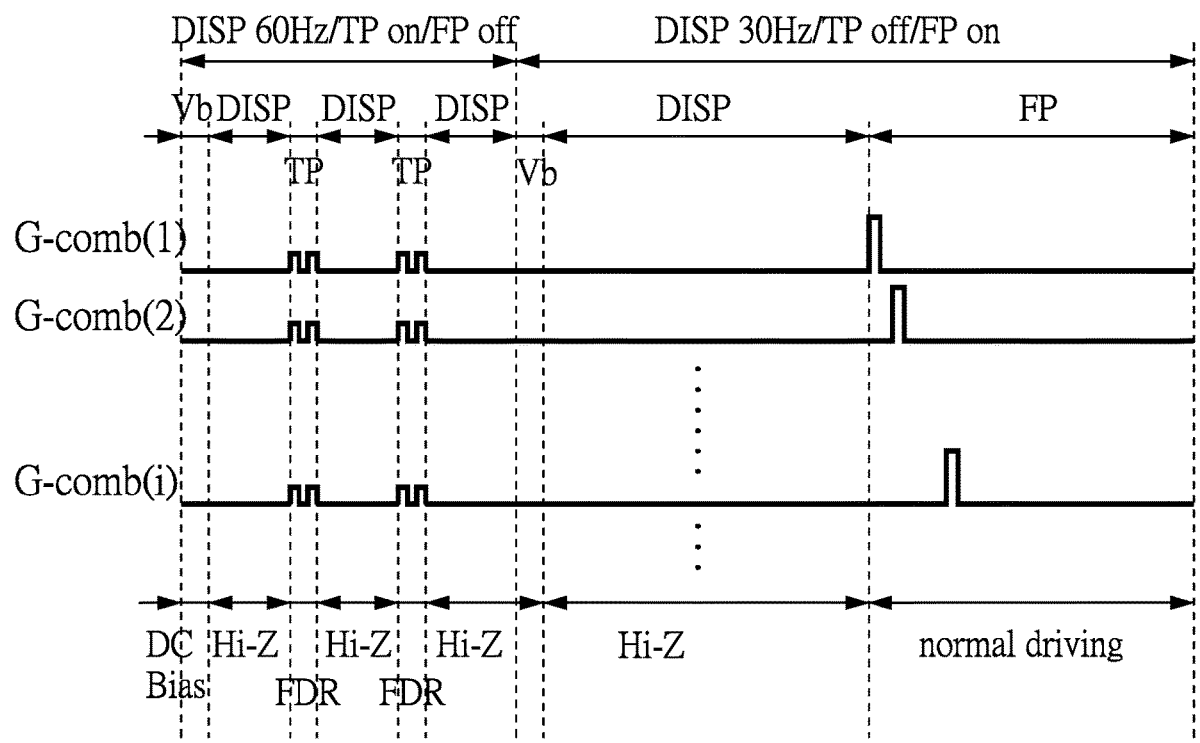
FIG. 7(B) is another operation timing diagram of the fingerprint display device using the fingerprint pixel unit of FIG. 5(A) according to the present disclosure.

FIG. 7(B) is another operation timing diagram of the fingerprint display device using the fingerprint pixel unit 21 of FIG. 5(A) according to the present disclosure, which is similar to FIG. 7(A) except that the reset and select multiplexing line G-comb is connected to a DC bias for a period of time interval such as the vertical blanking (Vb) interval so as to prevent the reset and select multiplexing line G-comb from unstable voltage level due to long-term floating, or avoid charges accumulated near the reset and select multiplexing line G-comb.

Figure 8:
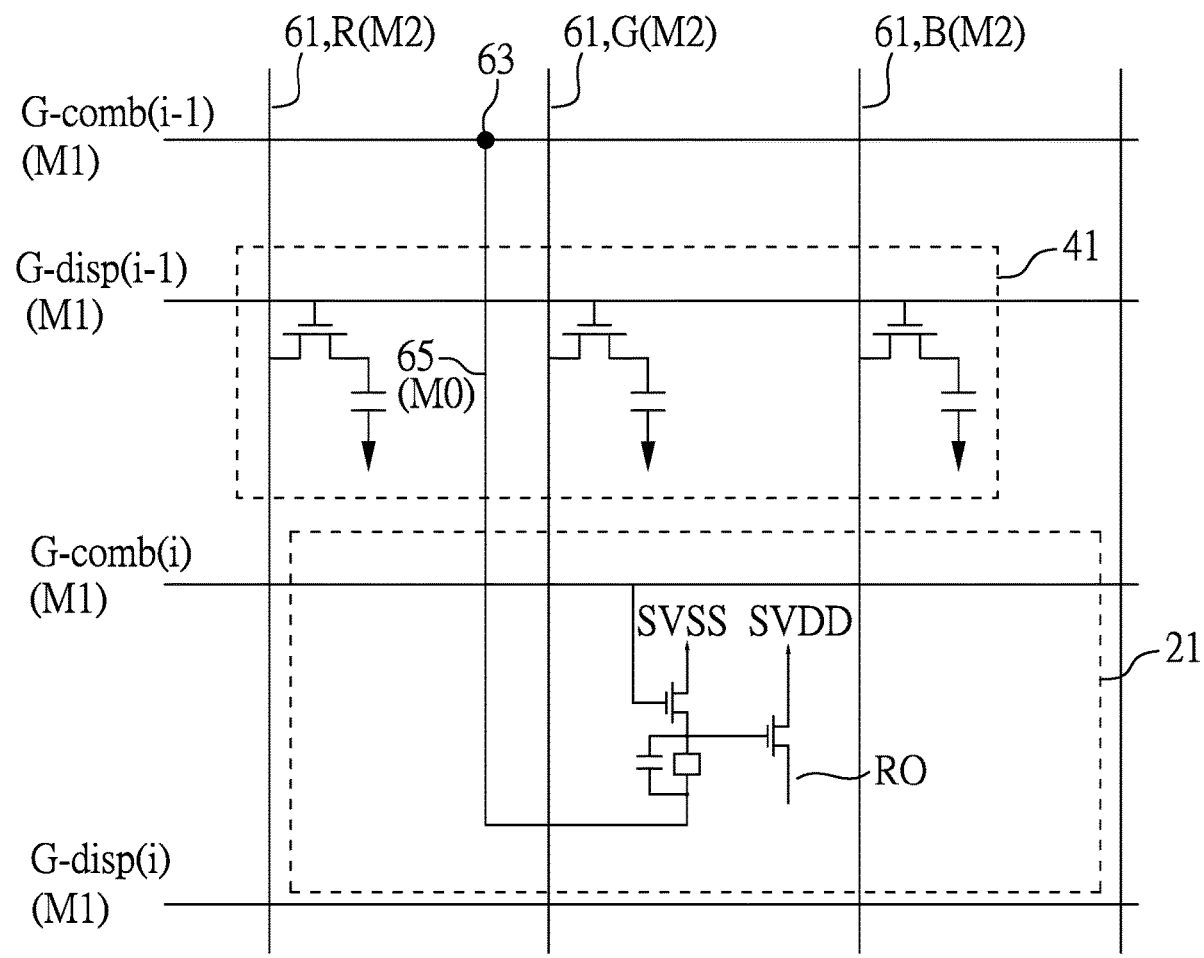
FIG. 8 is a schematic diagram illustrating the fingerprint pixel unit of FIG. 5(B) integrated into the display pixel unit according to the present disclosure.

FIG. 8 is a schematic diagram illustrating the fingerprint pixel unit 21 of FIG. 5(B) integrated into the display pixel unit 41 according to the present disclosure, which shows that the display pixel unit 41 includes three R/G/B sub-pixels of LCD integrated with a fingerprint pixel unit 21. The circuit area of the fingerprint pixel unit 21 is arranged in the area below the three R/G/B sub-pixels, but this is only an example and not a limitation. It is conceivable that the circuit area of the fingerprint pixel unit 21 may be concentrated to be arranged in the area below a specific sub-pixel. In addition, in this embodiment, an LCD panel is taken as an example, but the present disclosure is not limited to this. The present disclosure is also applicable to other types of panels such as OLED, or to other types of pixel arrangements such as RGBW. Although the display pixel unit 41 and the fingerprint pixel unit 21 in FIG. 8 belong to different pixel rows, they may belong to the same pixel row in other embodiments. In the present disclosure, the fingerprint pixel units 21 are arranged among the R/G/B sub-pixels of multiple display pixel units 41 while whether they belong to the same row or not can be adjusted according to the design requirement, and the present disclosure is not limited to this.

In the embodiment of FIG. 8, the LTPS LCD manufacturing process is taken as an example. The display scan lines G-disp and the reset and select multiplexing lines G-comb are made of metal-1 layer (M1). The data lines 61 connected to the three R/G/B sub-pixels are made of metal-2 layer (M2), which are marked as R(M2), G(M2) and B(M2) in FIG. 8. The data lines 61 are provided to send display data to each display sub-pixel. In one embodiment, the reset and select multiplexing line G-comb(i–1) can be transferred from metal-1 layer to another conductive layer, such as metal-0 layer (M0), through a via 63, and then connected to the circuit area of the fingerprint pixel unit 21 of the i-th row through the line 65 of the metal-0 layer. In order not to affect the aperture ratio, the line 65 the metal-0 layer can be disposed below the data line 61 and overlap with the data line 61. In addition, the bottom gate line 81 connected to the bottom gate (BG) of the reset transistor T1 can be made of the metal-0 layer, and is disposed below the data line 61 and overlaps with the data line 61. In another embodiment, the conductive layer used for layer transfer may be metal-3 layer (M3), and the line 65 is arranged above the data line 61, and extends along and substantially overlaps with the data line 61.

Figure 9:
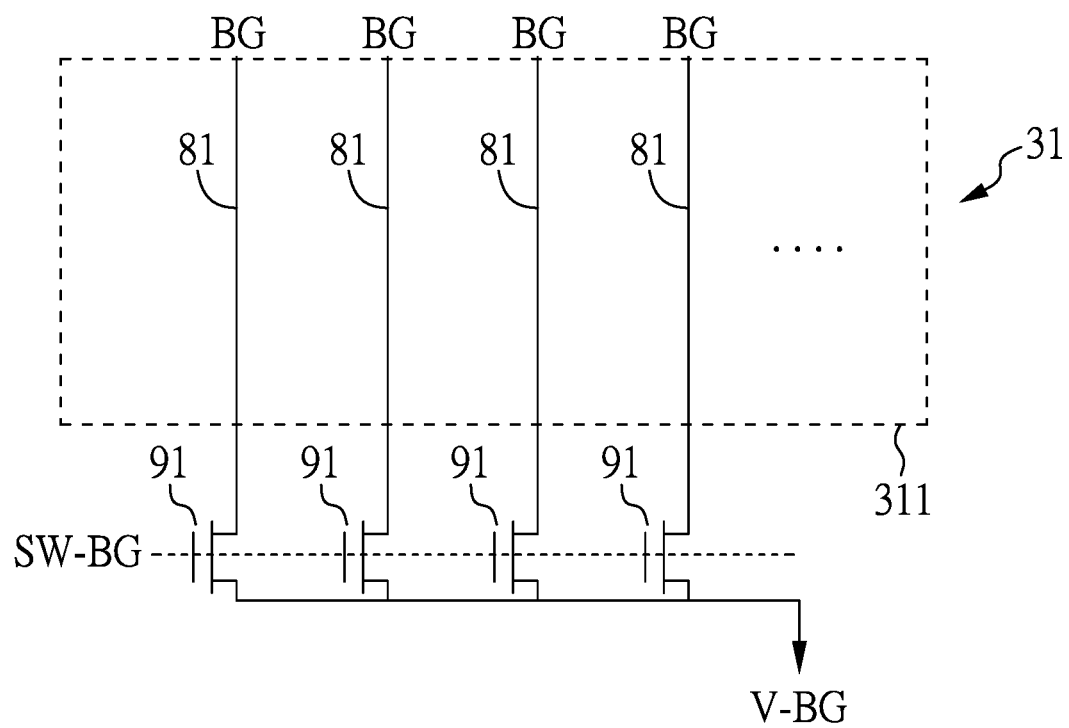
FIG. 9 is a schematic diagram illustrating the arrangement of the bottom gate line of the reset transistor on the panel.

FIG. 9 is a schematic diagram illustrating the arrangement of the bottom gate line 81 of the reset transistor T1 on the panel 31. At the periphery of the active area 311 of the panel 31, the bottom gate line 81 is connected to a bottom gate bias voltage V-BG through a switch 91, and the switch 91 is controlled to be turned on or off by a switch signal SW-BG Because the bottom gate line 81 overlaps with the data line 61, during the display data writing period, the switch 91 is turned off to make the bottom gate line 81 floating, which can reduce the capacitive load on the data line 61. In the fingerprint sensing period, the switch 91 is turned on to connect the bottom gate line 81 to the bottom gate bias voltage V-BG, so that the threshold voltage (Vth) of the reset transistor T1 can be adjusted by the bottom gate bias voltage V-BG to avoid electric leakage of reset transistor T1 during the exposure time. In one embodiment, the switch 91 may be omitted. For example, if the capacitive load is within an acceptable range, the switch 91 can be omitted.

Figure 10:
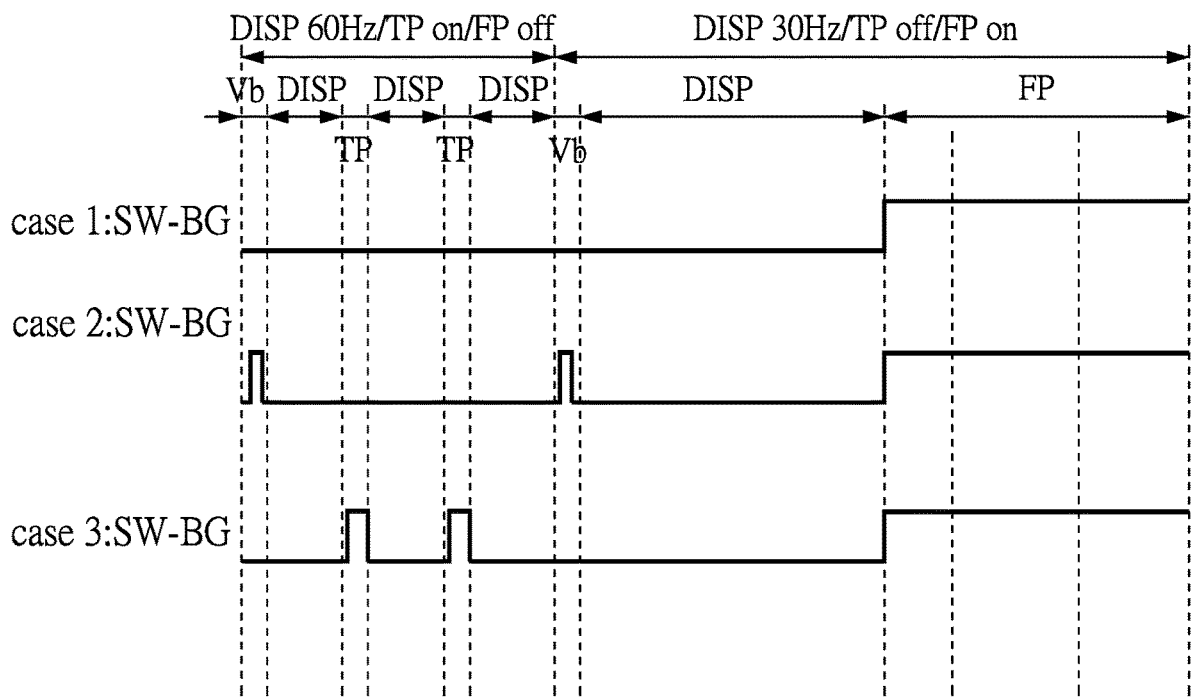
FIG. 10 is the operation timing diagram of the fingerprint pixel unit of FIG. 5(B) according to the present disclosure.

FIG. 10 is the operation timing diagram of the fingerprint pixel unit 21 of FIG. 5(B) according to the present disclosure. The fingerprint display device of this embodiment includes display, touch and fingerprint sensing functions. In FIG. 10, DISP stands for display, TP stands for touch, FP stands for fingerprint sensing, and Vb stands for vertical blanking. As shown in FIG. 10, in case 1, in display and touch period, the switch signal SW-BG is maintained at a low level to turn off the switch 91 so as to maintain the bottom gate line 81 in floating thereby reducing the load on the data line 61. In fingerprint sensing period, the switch signal SW-BG is switched to a high level so as to bias the bottom gate line 81 to a bottom gate bias voltage V-BG, thereby adjusting the threshold voltage (Vth) of the reset transistor T1. In case 2, it is similar to the driving of case 1 except that, during a period of time such as the vertical blanking (Vb) interval, the level of the bottom gate line 81 is updated to the bottom gate bias voltage V-BG so as to avoid voltage drift and charge accumulation caused by making the bottom gate line 81 floating for a long time. In case 3, it is similar to the driving of case 2 except that, during the touch period, the switch signal SW-BG is switched to a high level so as to turn on the switch 91, in which the bottom gate bias voltage V-BG is a full drive signal as same as the touch driving signal, where the voltage swing, phase and frequency of the full drive signal are approximately the same as those of the signal for driving the touch electrode, so as to reduce the load of the touch electrode.

Figure 11A:
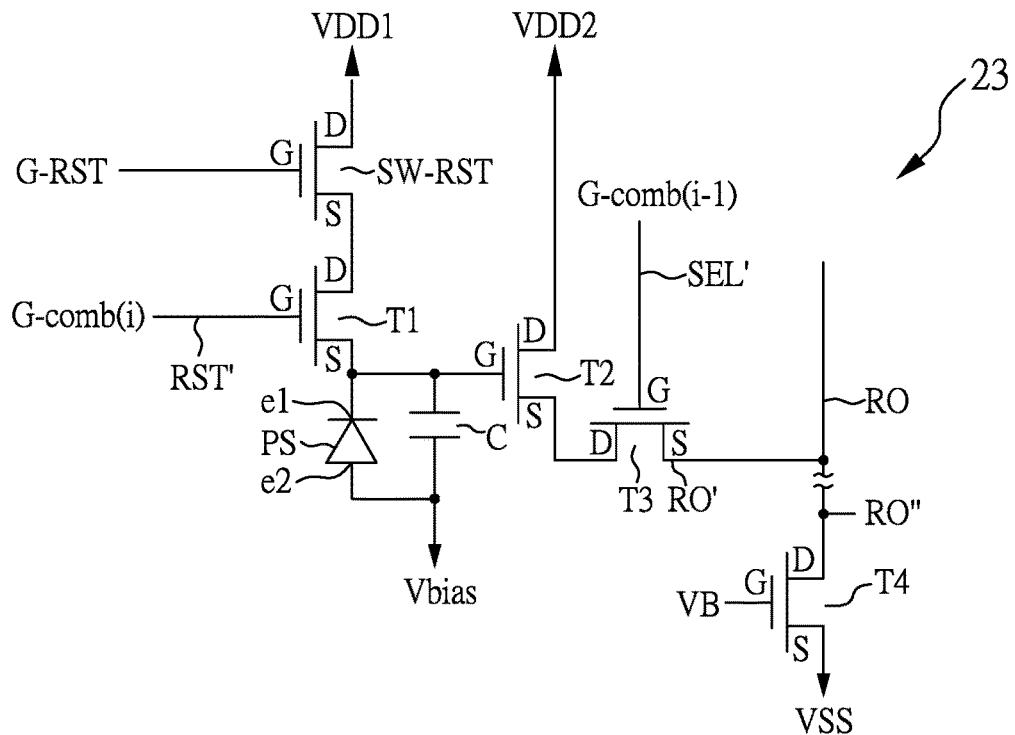
FIG. 11(A) is a circuit diagram of the fingerprint pixel unit of i-th pixel row according to another embodiment of the present disclosure.

FIG. 11(A) is a circuit diagram of the fingerprint pixel unit 23 of the i-th pixel row among the n pixel rows according to another embodiment of the present disclosure. The fingerprint pixel unit 23 has constituent elements similar to the fingerprint pixel unit 21 of FIG. 5(A) except that a reset switch transistor SW-RST is added. As shown in FIG. 11(A), the photo sensor PS has a first end e1, and a second end e2 connected to a bias voltage Vbias. The capacitor C has two ends respectively connected to the first end e1 and second end e2 of the photo sensor PS, wherein the capacitor C may be a capacitor structure formed by internal components of the photo sensor PS. The reset transistor T1 has a first connection end (D), a second connection end (S), and a control end (G) used as the reset end RST' and connected to the i-th reset and select multiplexing line G-comb(i) among the n reset and select multiplexing lines G-comb. The reset switch transistor SW-RST has a first connection end (D), a second connection end (S), and a control end (G) connected to a reset switch control line G-RST, wherein the reset transistor T1 and the reset switch transistor SW-RST are connected in series between the first voltage VDD1 and the first end e1 of the photo sensor PS through respective connection ends. The drive transistor T2 has a control end (G) connected to the first end e1 of the photo sensor PS, a first connection end (D) connected to the second voltage VDD2, and a second connection end (S), wherein the first voltage VDD1 and the second voltage VDD2 can be the same DC voltage source or different DC voltage sources. The select transistor T3 has a control end (G) used as the select end SEL' and connected to the (i−1)-th reset and select multiplexing line G-comb(i−1) among the n reset and select multiplexing lines, a first connection end (D) connected to the second connection end (S) of the drive transistor T2, and a second connection end (S) used as the readout end RO' and connected to the readout line RO. In addition, the control end (G) of the load transistor T4 is connected to a fifth voltage VB, and the two connection ends (D, S) thereof are respectively connected to the readout line RO and a sixth voltage VSS. Specifically, the second connection end (S) of the reset transistor T1 is connected to the first end e1 of the photo sensor PS, the first connection end (D) of the reset transistor T1 is connected to the second connection end (S) of the reset switch transistor SW-RST, and the first connection end (D) of the reset switch transistor SW-RST is connected to the first voltage VDD1.

Figure 11B:
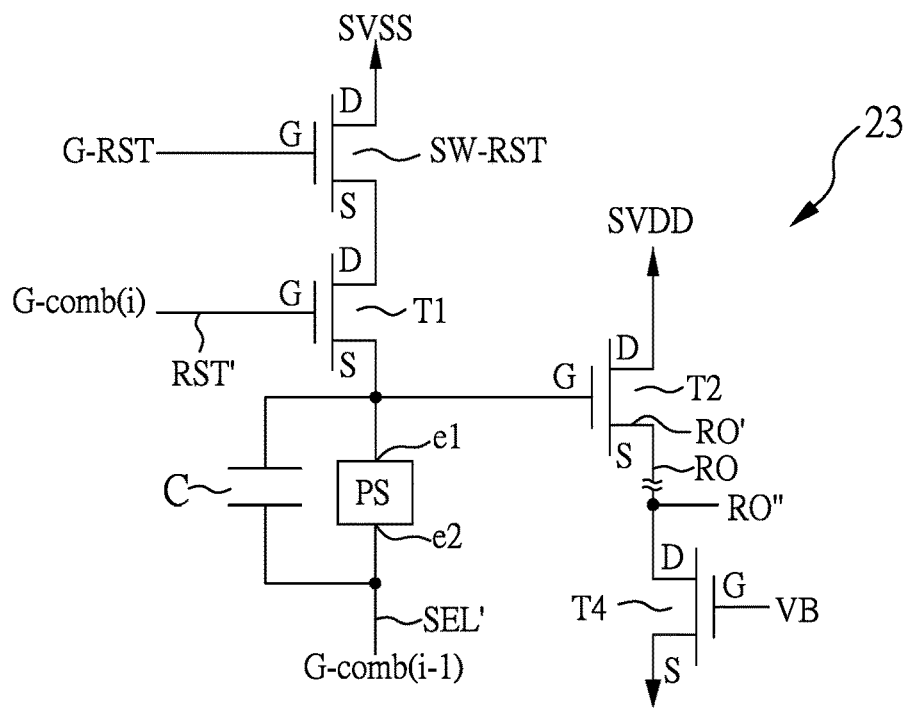
FIG. 11(B) is another circuit diagram of the fingerprint pixel unit of i-th pixel row according to another embodiment of the present disclosure.

FIG. 11(B) is another circuit diagram of the fingerprint pixel unit 23 of the i-th pixel row among the n pixel rows according to another embodiment of the present disclosure. The fingerprint pixel unit 23 has constituent elements similar to those of the fingerprint pixel unit 21 as shown in FIG. 5(B) except that a reset switch transistor SW-RST is added. As shown in FIG. 11(B), the photo sensor PS has a first end e1, and a second end e2 used as the select end SEL' and connected to the (i−1)-th reset and select multiplexing line G-comb(i−1) among the n reset and select multiplexing lines G-comb. The capacitor C has two ends respectively connected to the first end e1 and the second end e2 of the photo sensor PS, wherein the capacitor C may be a capacitor structure formed by internal components of the photo sensor PS, but it is not limited to this. The reset transistor T1 has a first connection end (D), a second connection end (S), and a control end (G) used as the reset end RST' and connected to the i-th reset and select multiplexing line G-comb(i) among the n reset and select multiplexing lines G-comb. The reset switch transistor SW-RST has a control end (G) connected to a reset switch control line G-RST, a first connection end (D), and a second connection end (S), wherein the reset transistor T1 and the reset switch transistor SW-RST are connected in series between the third voltage SVSS and the first end e1 of the photo sensor PS through their respective connection ends. The drive transistor T2 has a control end (G) connected to the first end e1 of the photo sensor PS, a first connection end (D) connected to the fourth voltage SVDD, and a second connection end (S) used as the readout end RO" and connected to the readout line RO. In addition, the control end (G) of the load transistor T4 is connected to the fifth voltage VB, and the first connection end (D) thereof is connected to the readout line RO. Specifically, the second connection end (S) of the reset transistor T1 is connected to the first end e1 of the photo sensor PS, the first connection end (D) of the reset transistor T1 is connected to the second connection end (S) of the reset switch transistor SW-RST, and the first connection end (D) of the reset switch transistor SW-RST is connected to the third voltage SVSS.

Figure 12:
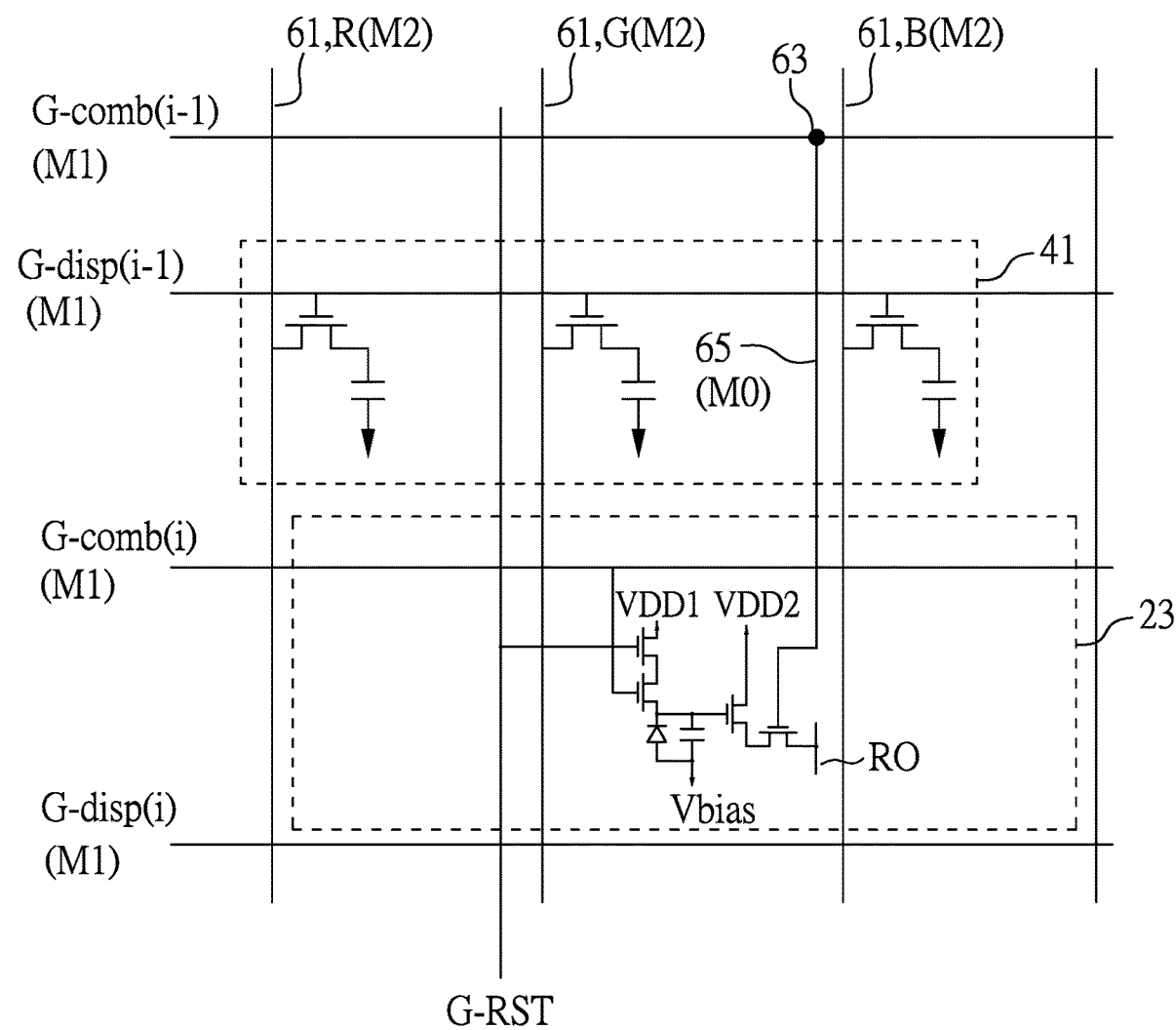
FIG. 12 is a schematic diagram illustrating the fingerprint pixel unit of FIG. 11(A) integrated into the display pixel unit according to the present disclosure.

FIG. 12 is a schematic diagram illustrating the fingerprint pixel unit 23 of FIG. 11(A) integrated into the display pixel unit 41 according to the present disclosure, which shows that the display pixel unit 41 includes three R/G/B sub-pixels of LCD integrated with a fingerprint pixel unit 23. The circuit area of the fingerprint pixel unit 23 is arranged in the area below the three R/G/B sub-pixels, but this is only an example and not a limitation. It is conceivable that the circuit area of the fingerprint pixel unit 23 may be concentrated to be arranged in the area below a specific sub-pixel. In addition, in this embodiment, an LCD panel is taken as an example, but the present disclosure is not limited to this. The present disclosure is also applicable to other types of panels such as OLED, or to other types of pixel arrangements such as RGBW.

In the embodiment of FIG. 12, the LTPS LCD manufacturing process is taken as an example. The display scan lines G-disp and the reset and select multiplexing lines G-comb are made of metal-1 layer (M1). The data lines 61 connected to the three R/G/B sub-pixels are made of metal-2 layer (M2), which are marked as R(M2), G(M2), and B(M2) in FIG. 12. The data lines 61 are provided to send display data to each display sub-pixel. In one embodiment, the reset and select multiplexing line G-comb (i−1) can be transferred from M1 to another conductive layer, such as metal-0 layer (M0), through a via 63, and then connected to the circuit area of the fingerprint pixel unit 23 in the i-th row through the line 65 of the metal-0 layer. In order not to affect the aperture ratio, the line 65 of the metal-0 layer can be disposed below the data line 61 and substantially overlap with the data line 61. In another embodiment, the conductive layer used for layer transfer may be metal-3 layer (M3), and the line 65 is arranged above the data line 61, and extends along and substantially overlaps with the data line 61. The reset switch control line G-RST may be made of metal-0 layer (M0) or metal-3 layer (M3), and is disposed to overlap with the data line 61, so that the aperture ratio will not be affected when using the reset switch control line G-RST. In addition, the integration of the fingerprint pixel unit 23 of FIG. 11(B) into the display pixel unit 41 of the present disclosure is also similar to that of FIG. 12, and thus a detailed description is deemed unnecessary.

Figure 13:
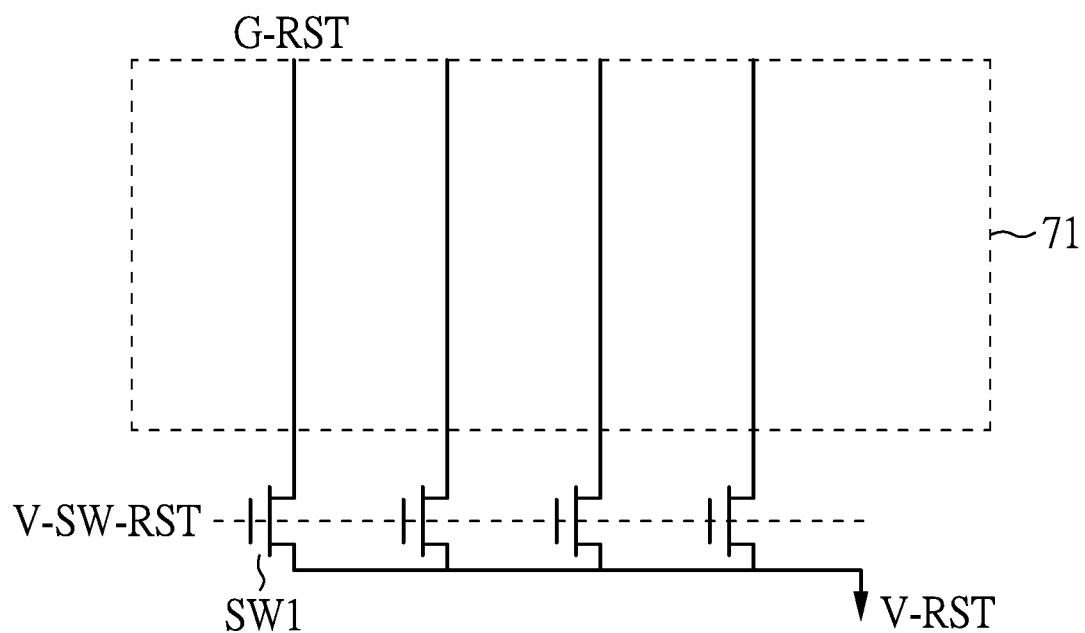
FIG. 13 is a schematic diagram illustrating the reset switch control line in the display area of the panel and its periphery according to the present disclosure.

FIG. 13 shows a schematic circuit diagram of the reset switch control line G-RST in the display area 71 of the panel 31 and its periphery, wherein the reset switch control line G-RST is connected to the reset voltage V-RST through the first switch SW1. For the convenience of control, each first switch SW1 can be connected to the same reset switch control signal V-SW-RST, wherein the reset switch control signal V-SW-RST and the reset voltage V-RST are provided by the integration integrated circuit 39 shown in FIG. 3. Since the reset switch control line G-RST overlaps the data line, when its RC load is large, the first switch SW1 has to be used to avoid influence caused by the load. That is, the first switch SW1 is turned off in the display interval, so that the reset switch control line G-RST becomes floating, and the first switch SW1 is turned on when the fingerprint sensing is activated. If the RC load is within an acceptable range, voltage can be directly applied to the reset switch control line G-RST without arrangement of the first switch SW1.

The operation of using the fingerprint pixel unit 23 of FIG. 11(A) or FIG. 11(B) for display and fingerprint sensing is similar to that of using the fingerprint pixel unit 21 of FIG. 5(A) or 5(B), except that the integration integrated circuit 39 of FIG. 3 is used to turn on or off the reset switch transistor SW-RST through the reset switch control line G-RST so as to further adjust the exposure time accordingly. When the reset switch transistor SW-RST is turned on so that the fingerprint pixel unit 23 is operated as if there is no switch transistor reset SW-RST, the reset and select multiplexing line G-comb (i−1) is activated (that is, the select end SEL' is activated), and then the reset and select multiplexing line G-comb(i) is enabled (that is, the reset end RST' is enabled). When the reset switch transistor SW-RST is turned off by the reset switch control line G-RST, the reset transistor T1 is inactivated so as to cause the capacitor C to be discharged. Since the added reset switch transistor SW-RST is able to determine whether to reset the storage capacitor C or not, the exposure time can be adjusted.

It can be seen from the above description that the reset line RST and the select line SEL of the optical fingerprint sensor are the main reasons for the reduction of the aperture ratio of the in-cell fingerprint display panel. In the fingerprint display device, and the integration integrated circuit and method for driving the fingerprint display device in accordance with the present disclosure, the reset line and the select line are integrated into a reset and select multiplexing line, so that the aperture ratio of the panel can be effectively improved while achieving the effect of fingerprint sensing.

The aforementioned embodiments are examples only for convenience of description. The scope of the present disclosure is claimed hereinafter in the claims and is not limited to the embodiments.

What is claimed is:

1. A fingerprint display device having a plurality of pixel rows, each pixel row of n pixel rows among the plurality of pixel rows having a plurality of display pixel units and a plurality of fingerprint pixel units, where n is an integer greater than 1, then pixel rows being driven by corresponding n display scan lines and n reset and select multiplexing lines for performing display and fingerprint sensing, wherein each fingerprint pixel unit has a reset end and a select end, the reset end of the fingerprint pixel unit of i-th pixel row among the n pixel rows is connected to i-th reset and select multiplexing line among the n reset and select multiplexing lines, and the select end of the fingerprint pixel unit of the i-th pixel row among the n pixel rows is directly connected to (i−1)-th reset and select multiplexing line of the n reset and select multiplexing lines, where i is an index value between 1 and n.

2. The fingerprint display device of claim 1, wherein the fingerprint pixel unit of the i-th pixel row among the n pixel rows includes:
   a reset transistor having a control end used as the reset end and connected to the i-th reset and select multiplexing line among the n reset and select multiplexing lines, and a first connection end connected to a first voltage, and a second connection end;
   a drive transistor having a control end connected to the second connection end of the reset transistor, a first connection end connected to a second voltage, and a second connection end;
   a select transistor having a control end used as the select end and connected to the (i−1)-th reset and select multiplexing line among the n reset and select multiplexing lines, a first connection end connected to the second connection end of the drive transistor, and a second connection end;

a photo sensor having two ends respectively connected to the second connection end of the reset transistor and a bias voltage; and a capacitor having two ends respectively connected to the control end of the drive transistor and the bias voltage.

3. The fingerprint display device of claim 2, wherein the second connection end of the select transistor is used as a readout end and connected to a readout line; the readout ends of the fingerprint pixel units in the same column are connected to a load transistor for sharing the load transistor; the load transistor has a control end connected to a fifth voltage, a first connection end connected to the readout line, and a second connection end connected to a sixth voltage.

4. The fingerprint display device of claim 2, wherein the reset and select multiplexing lines are driven sequentially; when driving the (i−1)-th reset and select multiplexing line among the n reset and select multiplexing lines, the select transistor of the (i−1)-th pixel row among the n pixel rows is turned on to read fingerprint signal, and then the i-th reset and select multiplexing line among the n reset and select multiplexing lines is driven to turn on the reset transistor of the fingerprint pixel unit of the i-th pixel row among the n pixel rows to reset voltage level of the capacitor.

5. The fingerprint display device of claim 2, wherein the plurality of pixel units are disposed on a panel, and an integration integrated circuit controls a display driving GOA circuit to sequentially drive the display scan lines for display, and controls a fingerprint sensing driving GOA circuit to sequentially drive the reset and select multiplexing lines for fingerprint sensing, where sensed fingerprint data is read from the readout line to the integration integrated circuit for performing fingerprint recognition.

6. The fingerprint display device of claim 5, wherein the panel senses touch of a finger and transmits touch signal to the integration integrated circuit so as to provide a touch sensing function.

7. The fingerprint display device of claim 6, wherein, when fingerprint sensing is not activated, display driving and touch sensing are performed on the panel in a time-sharing manner, in which, when performing display driving, the reset and select multiplexing line is configured to high impedance and, when performing touch sensing, a full drive signal as same as touch driving signal is sent to the reset and select multiplexing line; when fingerprint sensing is performed, the reset and select multiplexing lines are driven in sequence.

8. The fingerprint display device of claim 7, wherein, during a time period of vertical blanking interval, the reset and select multiplexing line is connected to a DC bias voltage.

9. The fingerprint display device of claim 2, wherein the display scan lines and the reset and select multiplexing lines are made of metal-1 layer, data lines connected to sub-pixels of the display pixel unit are made of metal-2 layer, the (i−1)-th reset and select multiplexing line among the n reset and select multiplexing lines is transferred from metal-1 layer to metal-0 layer or metal-3 layer through a via, and then connected to the fingerprint pixel unit of the i-th pixel row among the n pixel rows through a line of metal-0 layer or metal-3 layer, where the line of metal-0 layer or metal-3 layer is disposed to substantially overlap the data line.

10. The fingerprint display device of claim 1, wherein the fingerprint pixel unit of the i-th pixel row among the n pixel rows includes:

a reset transistor having a control end used as the reset end and connected to the i-th reset and select multiplexing line among the n reset and select multiplexing lines, a first connection end connected to a third voltage, and a second connection end;

a drive transistor having a control end connected to the second connection end of the reset transistor, a first connection end connected to a fourth voltage, and a second connection end;

a photo sensor having a first end connected to the second connection end of the reset transistor, and a second end used as the select end and connected to the (i−1)-th reset and select multiplexing line among the n reset and select multiplexing lines; and a capacitor having two ends respectively connected to the control end of the drive transistor and the second end of the photo sensor.

11. The fingerprint display device of claim 10, wherein the reset transistor is connected to a bottom gate.

12. The fingerprint display device of claim 11, wherein the display scan lines and the reset and select multiplexing lines are made of metal-1 layer, data lines connected to sub-pixels of the display pixel unit are made of metal-2 layer, and the (i−1)-th reset and select multiplexing line among the n reset and select multiplexing lines is transferred from metal-1 layer to metal-0 layer or metal-3 layer through a via and then connected to the fingerprint pixel unit of the i-th pixel row among the n pixel rows through a line of metal-0 layer or metal-3 layer, where the line of metal-0 layer or metal-3 layer is configured to substantially overlap the data line, and a bottom gate line connected to the bottom gate connected to the reset transistor is made of metal-0 layer or metal-3 layer and is configured to substantially overlap the data line.

13. The fingerprint display device of claim 12, wherein the bottom gate line is connected to a bottom gate bias voltage through a switch which is turned off to make the bottom gate line floating during a display data writing period, and which is turned on to make the bottom gate line connected to the bottom gate bias voltage during a fingerprint sensing period.

14. The fingerprint display device of claim 13, wherein, during a time period of vertical blanking interval, the voltage level of the bottom gate line is updated to the bottom gate bias voltage.

15. The fingerprint display device of claim 13, wherein, during a touch period, the switch is turned on and the bottom gate bias voltage is a full drive signal as same as the touch driving signal.

16. The fingerprint display device of 10, wherein the second connection end of the drive transistor is used as a readout end and connected to a readout line; the readout ends of the fingerprint pixel units in the same column are connected to a load transistor for sharing the load transistor; the load transistor has a control end connected to a fifth voltage, a first connection end connected to the readout line, and a second connection end.

17. The fingerprint display device of claim 10, wherein the reset and select multiplexing lines are driven sequentially; when driving the (i−1)-th reset and select multiplexing line among the n reset and select multiplexing lines, power is supplied to the photo sensor of the fingerprint pixel unit of the i-th pixel row among the n pixel rows to increase the voltage level of the select end thereby turning on the drive transistor to read fingerprint signal, and then the i-th reset and select multiplexing line among the n reset and select multiplexing lines is driven to turn on the reset transistor of the fingerprint pixel unit of the i-th pixel row among the n pixel rows to reset the voltage level of the capacitor.

18. The fingerprint display device of claim 10, wherein the plurality of pixel units are disposed on a panel, and an integration integrated circuit controls a display driving GOA circuit to sequentially drive the display scan lines for display, and controls a fingerprint sensing driving GOA circuit to sequentially drive the reset and select multiplexing lines for fingerprint sensing, where sensed fingerprint data is read from the readout line to the integration integrated circuit for performing fingerprint recognition.

19. The fingerprint display device of claim 18, wherein the panel senses touch of a finger and transmits touch signal to the integration integrated circuit so as to provide a touch sensing function.

20. The fingerprint display device of claim 1, wherein the fingerprint pixel unit of the i-th pixel row among the n pixel rows includes:
- a photo sensor having a first end, and a second end connected to a bias voltage;
- a capacitor having two ends respectively connected to the first end and the second end of the photo sensor;
- a reset transistor having a control end used as the reset end and connected to the i-th reset and select multiplexing line of the n reset and select multiplexing lines, a first connection end, and a second connection end;
- a reset switch transistor having a control end connected to a reset switch control line, a first connection end, and a second connection end, wherein the reset transistor and the reset switch transistor are connected in series between a first voltage and the first end of the photo sensor;
- a drive transistor having a control end connected to the first end of the photo sensor, a first connection end connected to a second voltage, and a second connection end; and
- a select transistor having a control end used as the select end and connected to the (i−1)-th reset and select multiplexing line of the n reset and select multiplexing lines, a first connection end connected to the second connection end of the drive transistor, and a second connection end.

21. The fingerprint display device of claim 20, wherein the second connection end of the select transistor is used as a readout end and connected to a readout line, the readout ends of the fingerprint pixel units in the same column are connected to a load transistor for sharing the load transistor, the load transistor has a control end connected to a fifth voltage, a first connection end connected to the readout line, and a second connection end connected to a sixth voltage.

22. The fingerprint display device of claim 20, wherein the second connection end of the reset transistor is connected to the first end of the photo sensor, the first connection end of the reset transistor is connected to the second connection end of the reset switch transistor, and the first connection end of the reset switch transistor is connected to the first voltage.

23. The fingerprint display device of claim 20, wherein the reset switch transistor is controlled by the reset switch control line to determine whether the capacitor is reset to adjust exposure time.

24. The fingerprint display device of claim 1, wherein the fingerprint pixel unit of the i-th pixel row among the n pixel rows includes:
- a photo sensor having a first end, and a second end used as the select end and connected to the (i−1)-th reset and select multiplexing line among the n reset and select multiplexing lines;
- a capacitor having two ends respectively connected to the first end and the second end of the photo sensor;
- a reset transistor having a control end used as the reset end and connected to the i-th reset and select multiplexing line of the n reset and select multiplexing lines, a first connection end, and a second connection end;
- a reset switch transistor having a control end connected to a reset switch control line, a first connection end, and a second connection end, wherein the reset transistor and the reset switch transistor are connected in series between a third voltage and the first end of the photo sensor; and
- a drive transistor having a control end connected to the first end of the photo sensor, a first connection end connected to a fourth voltage, and a second connection end.

25. The fingerprint display device of claim 24, wherein the second connection end of the drive transistor is used as a readout end and connected to a readout line, the readout ends of the fingerprint pixel units in the same column are connected to a load transistor for sharing the load transistor, and the load transistor has a control end connected to a fifth voltage, a first connection end connected to the readout line, and a second connection end.

26. The fingerprint display device of claim 24, wherein the second connection end of the reset transistor is connected to the first end of the photo sensor, the first connection end of the reset transistor is connected to the second connection end of the reset switch transistor, and the first connection end of the reset switch transistor is connected to the third voltage.

27. The fingerprint display device of claim 24, wherein the reset switch transistor is controlled by the reset switch control line to determine whether the capacitor is reset to adjust exposure time.

28. A method for driving a fingerprint display device having a plurality of pixel rows, each pixel row of n pixel rows among the plurality of pixel rows having a plurality of display pixel units and a plurality of fingerprint pixel units, where n is an integer greater than 1, the n pixel rows being driven at least by corresponding n display scan lines and n reset and select multiplexing lines for performing display and fingerprint sensing, each fingerprint pixel unit having a reset end and a select end, the method comprising:
- sequentially driving the n reset and select multiplexing lines, wherein, when driving the (i−1)-th reset and select multiplexing lines among the n reset and select multiplexing lines, the reset end of the fingerprint pixel unit of the (i−1)-th pixel row among the n pixel rows is activated, and the select end of the fingerprint pixel unit of the i-th pixel row among the n pixel rows is activated, where i is an index value between 1 and n.

29. An integration integrated circuit for controlling a fingerprint display device having a plurality of pixel rows, in which each pixel row of n pixel rows among the plurality of pixel rows has a plurality of display pixel units and a plurality of fingerprint pixel units, where n is an integer greater than 1, the n pixel rows are driven by corresponding n display scan lines and n reset and select multiplexing lines for performing display and fingerprint sensing, each fingerprint pixel unit has a reset end and a select end, the reset end of the fingerprint pixel unit of i-th pixel row among the n pixel rows is connected to i-th reset and select multiplexing line among the n reset and select multiplexing lines, and the select end of the fingerprint pixel unit of the i-th pixel row among then pixel rows is directly connected to (i−1)-th reset and select multiplexing line of the n reset and select multiplexing lines, where i is an index value between 1 and n, so as to sequentially drive the display scan lines for performing display, and sequentially drive the reset and select multiplexing lines for performing fingerprint sensing.

* * * * *